(12) United States Patent
Marks et al.

(10) Patent No.: US 9,864,174 B2
(45) Date of Patent: Jan. 9, 2018

(54) SYSTEM COMPRISING A SPECTRALLY SELECTIVE DETECTOR

(71) Applicant: Duke University, Durham, NC (US)

(72) Inventors: Daniel Marks, Durham, NC (US); David Jones Brady, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 15/351,077

(22) Filed: Nov. 14, 2016

(65) Prior Publication Data

US 2017/0059829 A1 Mar. 2, 2017

Related U.S. Application Data

(60) Division of application No. 14/185,364, filed on Feb. 20, 2014, now Pat. No. 9,494,771, which is a (Continued)

(51) Int. Cl.
| | |
|---|---|
| H04N 5/225 | (2006.01) |
| G02B 13/06 | (2006.01) |
| H04N 5/232 | (2006.01) |
| H04N 5/262 | (2006.01) |
| G02B 27/00 | (2006.01) |
| G02B 1/04 | (2006.01) |
| G02B 13/00 | (2006.01) |
| G02B 17/08 | (2006.01) |

(Continued)

(52) U.S. Cl.
CPC ............. *G02B 13/06* (2013.01); *G02B 1/041* (2013.01); *G02B 13/001* (2013.01); *G02B 17/0856* (2013.01); *G02B 27/0025* (2013.01); *G02B 27/0037* (2013.01); *G02B 27/4211* (2013.01); *H04N 5/2254* (2013.01); *H04N 5/23232* (2013.01); *H04N 5/23238* (2013.01); *H04N 5/247* (2013.01); *H04N 5/2624* (2013.01)

(58) Field of Classification Search
CPC ...... H04N 5/225; H04N 5/2254; H04N 5/232; H04N 5/23232; H04N 5/23238; H04N 5/247; H04N 5/262; G02B 13/06; G02B 1/041; G02B 27/0025; G02B 27/4211; G02B 13/001
See application file for complete search history.

(56) References Cited

U.S. PATENT DOCUMENTS

| 4,323,925 A | 4/1982 | Abell et al. |
| 5,012,081 A | 4/1991 | Jungwirth et al. |

(Continued)

OTHER PUBLICATIONS

"Notice of Allowance" dated Jan. 6, 2017 issued in U.S. Appl. No. 14/068,708.

(Continued)

*Primary Examiner* — Abdelaaziz Tissire
(74) *Attorney, Agent, or Firm* — Kaplan Breyer Schwarz, LLP

(57) ABSTRACT

Optical systems based on an objective lens comprising one or more plastic lens elements are disclosed. The inclusion of plastic lens element reduces one or more of system cost, size, weight, and/or complexity. The chromatic performance of some imaging systems in accordance with the present invention is improved by incorporation of a diffractive surface into the entry surface of the objective lens.

18 Claims, 35 Drawing Sheets

Related U.S. Application Data continuation-in-part of application No. 13/095,407, filed on Apr. 27, 2011, now Pat. No. 8,830,377, said application No. 14/185,364 is a continuation-in-part of application No. 12/651,894, filed on Jan. 4, 2010, now Pat. No. 8,259,212.

(60) Provisional application No. 61/328,213, filed on Apr. 27, 2010, provisional application No. 61/142,499, filed on Jan. 5, 2009.

(51) Int. Cl.
*G02B 27/42* (2006.01)
*H04N 5/247* (2006.01)

(56) References Cited

U.S. PATENT DOCUMENTS

| | | |
|---|---|---|
| 6,097,545 A | 8/2000 | Vaughan |
| 6,137,535 A | 10/2000 | Meyers |
| 6,320,703 B1 | 11/2001 | Chen et al. |
| 6,556,349 B2 | 4/2003 | Cox et al. |
| 8,830,377 B2 | 9/2014 | Marks et al. |
| 8,928,988 B1 | 1/2015 | Ford et al. |
| 8,932,894 B2 | 1/2015 | Christophersen et al. |
| 9,432,591 B2 | 8/2016 | Brady et al. |
| 9,473,700 B2 | 10/2016 | Cossairt et al. |
| 9,482,850 B2 | 11/2016 | Ford et al. |
| 2002/0135885 A1* | 9/2002 | Chen ............... G02B 26/10 359/662 |
| 2005/0052751 A1* | 3/2005 | Liu .................. G02B 3/0012 359/626 |
| 2007/0047424 A1* | 3/2007 | Wada ............... G11B 7/1275 369/112.23 |
| 2007/0109438 A1 | 5/2007 | Duparre et al. |
| 2015/0116553 A1 | 4/2015 | Ford et al. |
| 2015/0207990 A1 | 7/2015 | Ford et al. |

OTHER PUBLICATIONS

"Non-Final Office Action", dated Jan. 27, 2017, U.S. Appl. No. 14/978,800, 13 pp.

"Oral Proceedings Decision", European Patent Application EP 10 701 047.2—dated Jun. 19, 2017, 12 pp.

* cited by examiner

FIG. 4A

Table 1

| | |
|---|---|
| Surfaces | 6 |
| Stop | 3 |
| Effective Focal Length | 70.19076 |
| Back Focal Length | 45.74074 |
| Total Track | 120.0378 |
| Image Space F/# | 3.509538 |
| Paraxial Working F/# | 3.509538 |
| Working F/# | 3.508392 |
| Image Space NA | 0.1410447 |
| Object Space NA | 1e-009 |
| Stop Radius | 7.726984 |
| Paraxial Image Height | 121.574 |
| Paraxial Magnification | 0 |
| Entrance Pupil Diameter | 20 |
| Entrance Pupil Position | 35.18153 |
| Exit Pupil Diameter | 22.16519 |
| Exit Pupil Position | -77.73101 |
| Field Type | Angle in Degrees |
| Maximum Radial Field | 60 |
| Primary Wavelength | 0.5875618 μm |
| Lens Units | millimeters |
| Angular Magnification | 0.9023159 |

FIG. 4B

Table 2

| Surface | Type | Radius (mm) | Thickness (mm) | Material | Diameter (mm) | Conic |
|---|---|---|---|---|---|---|
| OBJ | STANDARD | Infinity | Infinity | | 0 | 0 |
| 1 | BINARY_2 | 61.67445 | 16.05157 | Polycarb | 84.70028 | 0 |
| 2 | EVENASPH | 52.71388 | 25.00019 | PMMA | 60.5373 | 0 |
| STO | STANDARD | Infinity | 15.43231 | PMMA | 17.27779 | 0 |
| 4 | EVENASPH | -15.01315 | 17.8715 | Polycarb | 60.5373 | 0 |
| 5 | EVENASPH | -35.61201 | 45.6822 | | 57.31639 | 0 |
| IMA | STANDARD | -77.19376 | | | 126.4918 | 0 |

FIG. 4C

Table 3

| Surface OBJ | STANDARD | | Surface STO | STANDARD |
|---|---|---|---|---|
| Surface 1 | BINARY_2 | | Surface 4 | EVENASPH |
| Diffract Order: | 1 | | Coeff on r 2: | 0 |
| Coeff on r 2: | 0 | | Coeff on r 4: | 2.5065531e-006 |
| Coeff on r 4: | -7.3519319e-008 | | Coeff on r 6: | 4.8741538e-008 |
| Coeff on r 6: | -7.3009646e-012 | | Coeff on r 8: | -3.3885023e-010 |
| Coeff on r 8: | -2.2899352e-014 | | Coeff on r 10: | 1.8654301e-012 |
| Coeff on r 10: | 2.5399125e-017 | | Coeff on r 12: | 0 |
| Coeff on r 12: | -8.7364176e-021 | | Coeff on r 14: | 0 |
| Coeff on r 14: | 0 | | Coeff on r 16: | 0 |
| Coeff on r 16: | 0 | | | |
| Maximum Term: | 4 | | Surface 5 | EVENASPH |
| Maximum rad ap: | 100 | | Coeff on r 2: | 0 |
| Term on P to 2: | 1901.1564 | | Coeff on r 4: | 3.5017483e-007 |
| Term on P to 4: | -5838.1932 | | Coeff on r 6: | 4.3614728e-010 |
| Term on P to 6: | 29740.95 | | Coeff on r 8: | -2.4102982e-013 |
| Term on P to 8: | -39579.782 | | Coeff on r 10: | 6.4970918e-016 |
| | | | Coeff on r 12: | 0 |
| Surface 2 | EVENASPH | | Coeff on r 14: | 0 |
| Coeff on r 2: | 0 | | Coeff on r 16: | 0 |
| Coeff on r 4: | -1.1036117e-007 | | | |
| Coeff on r 6: | -8.1862318e-010 | | | |
| Coeff on r 8: | 2.1378301e-012 | | | |
| Coeff on r 10: | -1.2698635e-015 | | | |
| Coeff on r 12: | 0 | | | |
| Coeff on r 14: | 0 | | | |
| Coeff on r 16: | 0 | | | |

FIG. 7

Table 4

| Radius (mm) | Thickness (mm) | Glass (Schott catalog) | Semi-Diameter (mm) | Conic K | Comments |
|---|---|---|---|---|---|
| Infinity | 2.118 | F2 (n=1.620040, V=36.366491) | 5.000 | | Start of secondary lens |
| -29.950 | 26.713 | Air | 5.000 | 7.569 | |
| 10.689 | 2.917 | FK51 (n=1.486561, V=84.467994) | 5.000 | -1.491 | |
| -6.724 | 5.009 | Air | 5.000 | -3.189 | |
| -1.661 | 1.895 | F2 (n=1.620040, V=36.366491) | 5.000 | -1.967 | Secondary lens stop position |
| -3.944 | 1.093 | Air | 5.000 | -2.893 | |
| 3.402 | 6.572 | FK51 (n=1.486561, V=84.467994) | 5.000 | -2.893 | |
| -12.748 | 5.000 | Air | 5.000 | -7.770 | End of secondary lens |
| Infinity | --- | Image Plane | 1.717 | | Image Plane |

FIG. 9A

Table 5

| | |
|---|---|
| Surfaces | 6 |
| Stop | 3 |
| Effective Focal Length | 70.33181 |
| Back Focal Length | 0.0951875 |
| Total Track | 99.45313 |
| Image Space F/# | 3.51659 |
| Paraxial Working F/# | 3.51659 |
| Working F/# | 3.513796 |
| Image Space NA | 0.1407674 |
| Object Space NA | 1e-009 |
| Stop Radius | 6.677573 |
| Paraxial Image Height | 121.8183 |
| Paraxial Magnification | 0 |
| Entrance Pupil Diameter | 20 |
| Entrance Pupil Position | 29.62701 |
| Exit Pupil Diameter | 19.88705 |
| Exit Pupil Position | -69.83943 |
| Field Type | Angle in Degrees |
| Maximum Radial Field | 60 |
| Primary Wavelength | 0.5875618 μm |
| Lens Units | millimeters |
| Angular Magnification | 1.005679 |

FIG. 9B

Table 6

| Surface | Type | Radius (mm) | Thickness (mm) | Material | Diameter (mm) | Conic |
|---|---|---|---|---|---|---|
| OBJ | STANDARD | Infinity | Infinity | | 0 | 0 |
| 1 | BINARY_2 | 29.19903 | 16.46968 | Polycarb | 55.08565 | 0 |
| 2 | EVENASPH | 12.71133 | 13.01913 | PMMA | 24.99983 | 0 |
| 3 | STANDARD | Infinity | 69.96432 | PMMA | 14.72076 | 0 |
| 4 | STANDARD | -70.21966 | 0 | | 121.6486 | 0 |
| 5 | STANDARD | Infinity | 0 | | 268.0974 | 0 |
| IMA | STANDARD | -70.21966 | | | 121.6486 | 0 |

FIG. 9C    Table 7

| | |
|---|---|
| Surface OBJ | STANDARD |
| Surface 1 | BINARY_2 |
| Diffract Order: | 1 |
| Coeff on r 2: | 0 |
| Coeff on r 4: | -1.8235807e-008 |
| Coeff on r 6: | 3.4306404e-011 |
| Coeff on r 8: | -5.7384493e-014 |
| Coeff on r 10: | 3.2974226e-017 |
| Coeff on r 12: | 0 |
| Coeff on r 14: | 0 |
| Coeff on r 16: | 0 |
| Maximum Term: | 4 |
| Maximum rad ap: | 100 |
| Term on P to 2: | 261.82857 |
| Term on P to 4: | -6215.4428 |
| Term on P to 6: | 121099.01 |
| Term on P to 8: | -815687.46 |
| Surface 2 | EVENASPH |
| Coeff on r 2: | 0 |
| Coeff on r 4: | -1.0001805e-006 |
| Coeff on r 6: | 1.9550771e-008 |
| Coeff on r 8: | -2.068477e-010 |
| Coeff on r 10: | 6.8591627e-013 |
| Coeff on r 12: | 0 |
| Coeff on r 14: | 0 |
| Coeff on r 16: | 0 |
| Surface STO | STANDARD |
| Surface 4 | STANDARD |
| Surface 5 | STANDARD |
| Surface IMA | STANDARD |

FIG. 13A

Table 8

| | |
|---|---|
| Surfaces | 6 |
| Stop | 3 |
| System Aperture | Entrance Pupil Diameter=20 |
| Effective Focal Length | 71.51765 |
| Back Focal Length | 0.7028417 |
| Total Track | 99.80818 |
| Image Space F/# | 3.575883 |
| Paraxial Working F/# | 3.575883 |
| Working F/# | 3.570637 |
| Image Space NA | 0.1384785 |
| Object Space NA | 1e-009 |
| Stop Radius | 6.680638 |
| Paraxial Image Height | 7.516808 |
| Paraxial Magnification | 0 |
| Entrance Pupil Diameter | 20 |
| Entrance Pupil Position | 29.75657 |
| Exit Pupil Diameter | 8.241712 |
| Exit Pupil Position | -29.36855 |
| Field Type | Angle in Degrees |
| Maximum Radial Field | 6 |
| Primary Wavelength | 0.5875618 μm |
| Lens Units | millimeters |
| Angular Magnification | 2.42668 |

FIG. 13B

Table 9

| Surface | Type | Radius (mm) | Thickness (mm) | Material | Diameter (mm) | Conic |
|---|---|---|---|---|---|---|
| OBJ | STANDARD | Infinity | Infinity | | 0 | 0 |
| 1 | BINARY_2 | 29.37745 | 16.59467 | Polycarb | 55.37109 | 0 |
| 2 | EVENASPH | 12.76619 | 13.03937 | PMMA | 25.08668 | 0 |
| 3 | STANDARD | Infinity | 68.96349 | PMMA | 14.70421 | 0 |
| 4 | STANDARD | -70.69814 | 0.6106427 | BK7 | 121.1787 | 0 |
| 5 | STANDARD | 39.85281 | 0.6 | | 14.84297 | 0 |
| IMA | STANDARD | Infinity | | | 14.80296 | 0 |

FIG. 13C

Table 10

| Surface OBJ | STANDARD | | Surface 2 | EVENASPH |
|---|---|---|---|---|
| Surface 1 | BINARY_2 | | Coeff on r 2: | 0 |
| Diffract Order: | 1 | | Coeff on r 4: | -8.1825939e-007 |
| Coeff on r 2: | 0 | | Coeff on r 6: | 1.5454672e-008 |
| Coeff on r 4: | -1.6619359e-008 | | Coeff on r 8: | -1.6833311e-010 |
| Coeff on r 6: | 3.0452986e-011 | | Coeff on r 10: | 5.6328582e-013 |
| Coeff on r 8: | -5.0073176e-014 | | Coeff on r 12: | 0 |
| Coeff on r 10: | 2.8154356e-017 | | Coeff on r 14: | 0 |
| Coeff on r 12: | 0 | | Coeff on r 16: | 0 |
| Coeff on r 14: | 0 | | Aperture: | Floating Aperture |
| Coeff on r 16: | 0 | | Maximum Radius: | 12.54334 |
| Maximum Term: | 4 | | Surface STO | STANDARD |
| Maximum rad ap: | 100 | | Aperture: | Floating Aperture |
| Term on P to 2: | 206.78659 | | Maximum Radius: | 7.352103 |
| Term on P to 4: | -5493.449 | | Surface 4 | STANDARD |
| Term on P to 6: | 110723.44 | | Aperture: | Floating Aperture |
| Term on P to 8: | -759453.23 | | Maximum Radius: | 60.58934 |
| Aperture: | Floating Aperture | | Surface 5 | STANDARD |
| Maximum Radius: | 27.68554 | | Surface IMA | STANDARD |

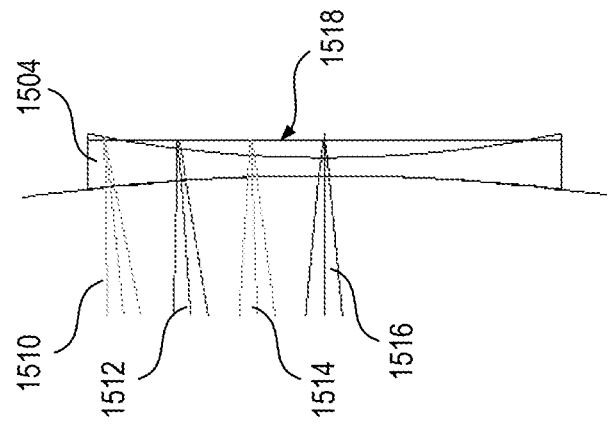
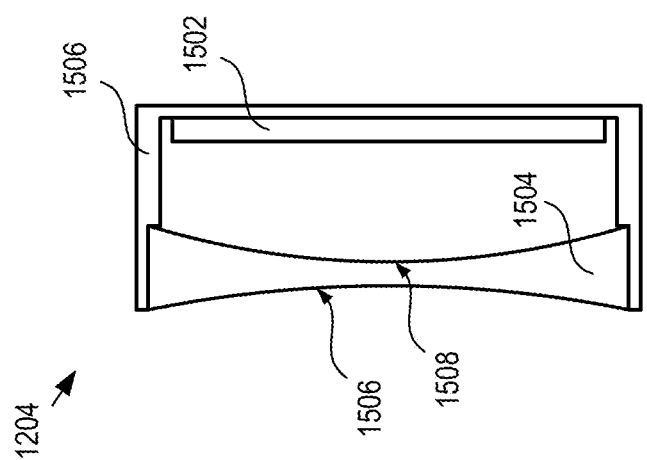
FIG. 15B
FIG. 15A

FIG. 17A

Table 11

| | |
|---|---|
| Surfaces | 10 |
| Stop | 5 |
| Effective Focal Length | 49.28507 |
| Back Focal Length | 17.28423 |
| Total Track | 51.8 |
| Image Space F/# | 4.928507 |
| Paraxial Working F/# | 4.928507 |
| Working F/# | 4.905772 |
| Image Space NA | 0.1009325 |
| Object Space NA | 5e-010 |
| Stop Radius | 3.265498 |
| Paraxial Image Height | 85.36425 |
| Paraxial Magnification | 0 |
| Entrance Pupil Diameter | 10 |
| Entrance Pupil Position | 51.8 |
| Exit Pupil Diameter | 10 |
| Exit Pupil Position | 49.18465 |
| Field Type | Angle in Degrees |
| Maximum Radial Field | 60 |
| Primary Wavelength | 0.5875618 μm |
| Lens Units | millimeters |
| Angular Magnification | -1 |

FIG. 17B

Table 12

| Surface | Type | Radius (mm) | Thickness (mm) | Material | Diameter (mm) | Conic |
|---|---|---|---|---|---|---|
| OBJ | STANDARD | Infinity | Infinity | | 0 | 0 |
| 1 | STANDARD | Infinity | 20 | | 189.4405 | 0 |
| 2 | STANDARD | 31.8 | 16.55286 | Polycarb | 57.40874 | 0 |
| 3 | STANDARD | 15.24714 | 15.24714 | E48R | 28.19619 | 0 |
| 4 | STANDARD | - | 0 | | - | 0 |
| STO | STANDARD | Infinity | 0 | | 30 | 0 |
| 6 | COORDBRK | - | 0 | | - | - |
| 7 | STANDARD | Infinity | -15.24714 | E48R | 6.846346 | 0 |
| 8 | STANDARD | 15.24714 | -16.55286 | Polycarb | 27.57015 | 0 |
| 9 | STANDARD | 31.8 | -17.38465 | MIRROR | 55.94507 | 0 |
| IMA | STANDARD | 49.18465 | | | 85.19324 | 0 |

FIG. 17C    Table 13

| | |
|---|---|
| Surface OBJ | STANDARD |
| Surface 1 | STANDARD |
| Surface 2 | STANDARD |
| Surface 3 | STANDARD |
| Surface 4 | COORDBRK |
| Decenter X: | 0 |
| Decenter Y: | 0 |
| Tilt about X: | 0 |
| Tilt about Y: | 45 |
| Tilt about Z: | 0 |
| Order: | Decenter then tilt |
| Surface STO | STANDARD |
| Aperture: | Floating Aperture |
| Maximum Radius: | 15 |
| Surface 6 | COORDBRK |
| Decenter X: | 0 |
| Decenter Y: | 0 |
| Tilt about X: | 0 |
| Tilt about Y: | 45 |
| Tilt about Z: | 0 |
| Order: | Decenter then tilt |
| Surface 7 | STANDARD |
| Surface 8 | STANDARD |
| Surface 9 | STANDARD |
| Surface IMA | STANDARD |

1800

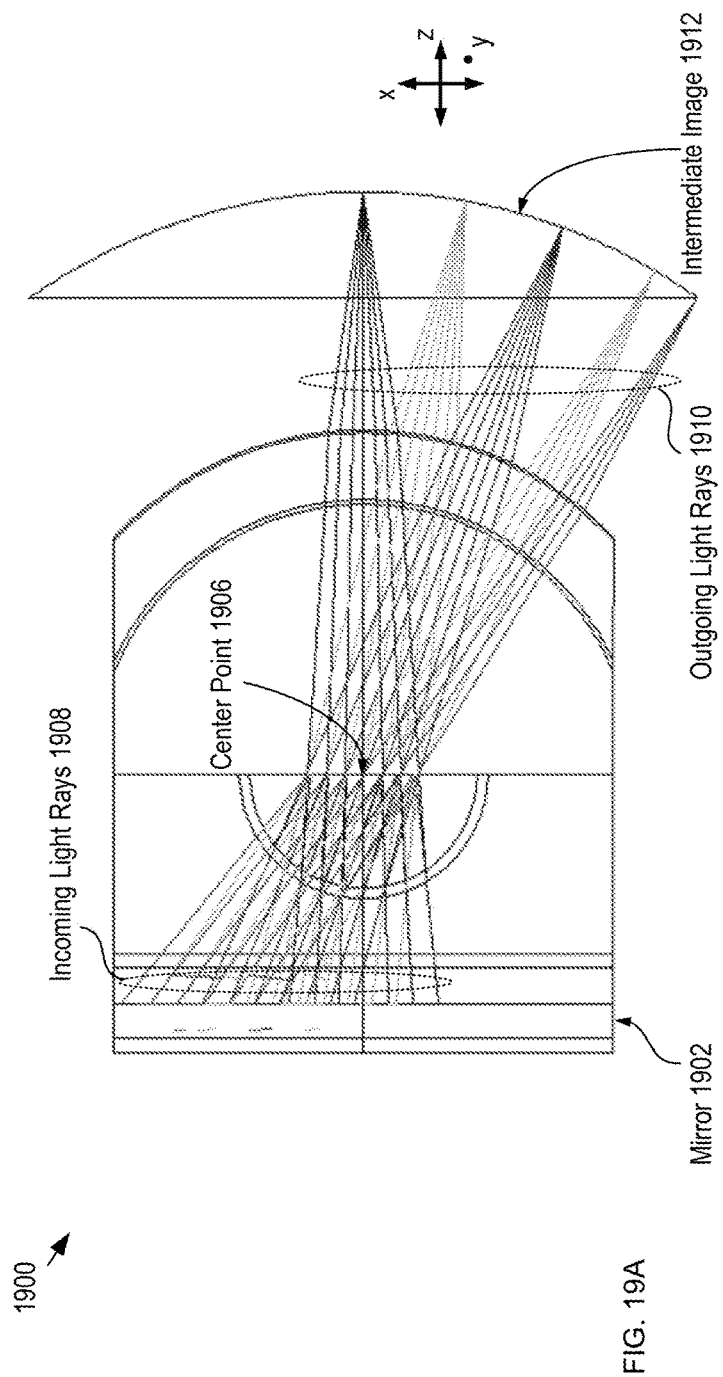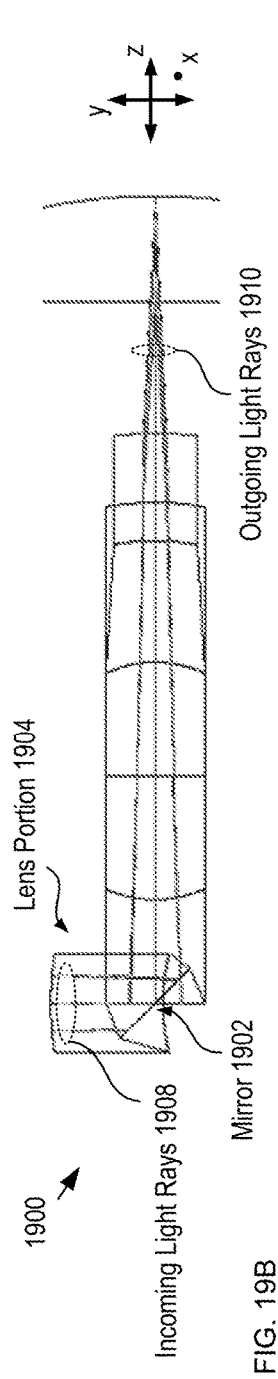
FIG. 19A
FIG. 19B

FIG. 20A

Table 14

| | |
|---|---|
| Surfaces | 13 |
| Stop | 10 |
| Effective Focal Length | 70.05064 |
| Back Focal Length | 28.52916 |
| Total Track | 110.0028 |
| Image Space F/# | 3.502532 |
| Paraxial Working F/# | 3.502532 |
| Working F/# | 3.500003 |
| Image Space NA | 0.1413212 |
| Object Space NA | 1e-009 |
| Stop Radius | 6.703903 |
| Paraxial Image Height | 49.04999 |
| Paraxial Magnification | 0 |
| Entrance Pupil Diameter | 20 |
| Entrance Pupil Position | 40 |
| Exit Pupil Diameter | 20 |
| Exit Pupil Position | 70.00277 |
| Field Type | Angle in Degrees |
| Maximum Radial Field | 35 |
| Primary Wavelength | 0.5875618 μm |
| Lens Units | millimeters |
| Angular Magnification | -1 |

FIG. 20B

Table 15

| Surface | Type | Radius (mm) | Thickness (mm) | Material | Diameter (mm) | Conic |
|---|---|---|---|---|---|---|
| OBJ | STANDARD | Infinity | Infinity | | 0 | 0 |
| 1 | STANDARD | 40 | 12.571 | Polycarb | 58.33382 | 0 |
| 2 | COORDBRK | - | 0 | | - | - |
| 3 | STANDARD | Infinity | 0 | MIRROR | 67.86903 | 0 |
| 4 | STANDARD | - | 0 | | - | - |
| 5 | STANDARD | Infinity | 12.571 | Polycarb | 58.42571 | 0 |
| 6 | COORDBRK | Infinity | -40 | Polycarb | 79.12237 | 0 |
| 7 | STANDARD | Infinity | 40 | Polycarb | 13.41386 | 0 |
| 8 | STANDARD | Infinity | -25.14201 | Polycarb | 79.12237 | 0 |
| 9 | STANDARD | -14.85799 | -14.85799 | ACRYLIC | 25.68105 | 0 |
| STO | STANDARD | Infinity | -33.02296 | ACRYLIC | 13.97479 | 0 |
| 11 | STANDARD | 33.02296 | -8.402776 | Polycarb | 43.78879 | 0 |
| 12 | STANDARD | 41.42573 | -28.57704 | | 52.9075 | 0 |
| IMA | STANDARD | 70.00277 | | | 80.31031 | 0 |

FIG. 20C
Table 16

| | | | | |
|---|---|---|---|---|
| Surface OBJ | STANDARD | | Surface 7 | STANDARD |
| Surface 1 | STANDARD | | Surface 8 | Rectangular Aperture, Pickup From Surface 1 |
| Aperture: | Rectangular Aperture | | Aperture: | |
| X Half Width: | 6 | | X Half Width: | 6 |
| Y Half Width: | 30 | | Y Half Width: | 30 |
| Surface 2 | COORDBRK | | Surface 9 | STANDARD |
| Decenter X: | 0 | | Aperture: | Rectangular Aperture |
| Decenter Y: | 0 | | X Half Width: | 6 |
| Tilt about X: | 0 | | Y Half Width: | 30 |
| Tilt about Y: | -45 | | | |
| Tilt about Z: | 0 | | | |
| Order: | Decenter then tilt | | | |
| Surface 3 | STANDARD | | Surface STO | STANDARD |
| Aperture: | Rectangular Aperture, Pickup From Surface 1 | | Aperture: | Rectangular Aperture |
| | | | X Half Width: | 6 |
| X Half Width: | 6 | | Y Half Width: | 30 |
| Y Half Width: | 30 | | | |
| Surface 4 | COORDBRK | | Surface 11 | STANDARD |
| Decenter X: | 0 | | Aperture: | Rectangular Aperture |
| Decenter Y: | 0 | | X Half Width: | 6 |
| Tilt about X: | 0 | | Y Half Width: | 30 |
| Tilt about Y: | -45 | | | |
| Tilt about Z: | 0 | | Surface 12 | STANDARD |
| Order: | Decenter then tilt | | Aperture: | Rectangular Aperture |
| Surface 5 | STANDARD | | X Half Width: | 5 |
| Surface 6 | STANDARD | | Y Half Width: | 30.13598 |
| | | | Surface IMA | STANDARD |

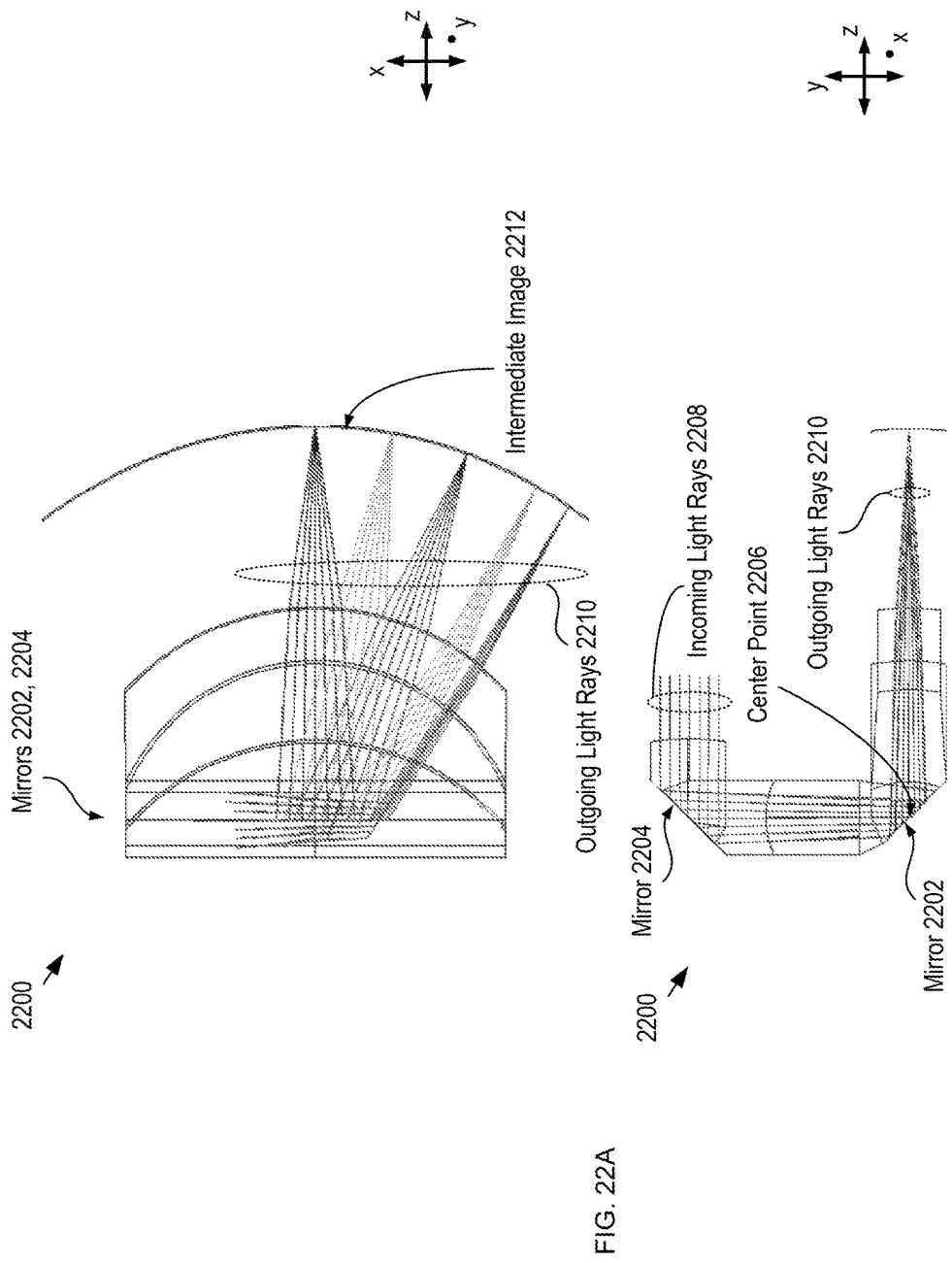

FIG. 23A

Table 17

| | |
|---|---|
| Surfaces | 20 |
| Stop | 13 |
| Effective Focal Length: | 70.05092 |
| Back Focal Length: | 28.62492 |
| Total Track : | 62.003 |
| Image Space F/#: | 3.502546 |
| Paraxial Working F/#: | 4.467006 |
| Working F/#: | 4.463886 |
| Image Space NA: | 0.1412814 |
| Object Space NA: | 1e-009 |
| Stop Radius: | 6.703903 |
| Paraxial Image Height: | 49.05018 |
| Paraxial Magnification: | 0 |
| Entrance Pupil Diameter: | 20 |
| Entrance Pupil Position: | 50 |
| Exit Pupil Diameter: | 20 |
| Exit Pupil Position: | -70.003 |
| Field Type: | Angle in degrees |
| Maximum Radial Field: | 35 |
| Primary Wavelength: | 0.5875618 μm |
| Lens Units: | Millimeters |
| Angular Magnification: | 1 |

FIG. 23B

Table 18

| Surface | Type | Radius (mm) | Thickness (mm) | Material | Diameter (mm) | Conic |
|---|---|---|---|---|---|---|
| OBJ | STANDARD | Infinity | Infinity | | 0 | 0 |
| 1 | STANDARD | Infinity | 10 | | 60.00086 | 0 |
| 2 | STANDARD | 40 | 120.571 | POLYCARB | 44.25348 | 0 |
| 3 | COORDBRK | - | 0 | | - | - |
| 4 | STANDARD | Infinity | 0 | MIRROR | 38.55975 | 0 |
| 5 | COORDBRK | - | 0 | | - | - |
| 6 | STANDARD | Infinity | -27.4 | POLYCARB | 38.7483 | 0 |
| 7 | STANDARD | Infinity | 27.4 | POLYCARB | 13.1558 | 0 |
| 8 | STANDARD | Infinity | 12.571 | POLYCARB | 38.7483 | 0 |
| 9 | STANDARD | Infinity | -40 | POLYCARB | 50.52041 | 0 |
| 10 | STANDARD | Infinity | 40 | POLYCARB | 13.12872 | 0 |
| 11 | STANDARD | Infinity | -25.14201 | POLYCARB | 50.52041 | 0 |
| 12 | STANDARD | -14.85799 | -14.85799 | ACRYLIC | 22.30054 | 0 |
| STO | STANDARD | Infinity | -8 | ACRYLIC | 13.76295 | 0 |
| 14 | COORDBRK | - | 0 | | - | - |
| 15 | STANDARD | Infinity | 0 | MIRROR | 24.96581 | 0 |
| 16 | COORDBRK | - | 0 | | - | - |
| 17 | STANDARD | Infinity | 25.023 | ACRYLIC | 22.93886 | 0 |
| 18 | STANDARD | -33.023 | 8.403 | POLYCARB | 43.7875 | 0 |
| 19 | STANDARD | -41.426 | 28.577 | | 52.90648 | 0 |
| IMA | STANDARD | -70.003 | | | 80.31077 | 0 |

FIG. 23C
Table 19

| | | | | |
|---|---|---|---|---|
| Surface OBJ | STANDARD | Surface 6 | STANDARD | Surface 15 | STANDARD |
| Surface 1 | STANDARD | Aperture: | Rectangular Aperture | Aperture: | Rectangular Aperture |
| Aperture: | Rectangular Aperture | X Half Width: | 6 | X Half Width: | 6 |
| X Half Width: | 6 | Y Half Width: | 30 | Y Half Width: | 30 |
| Y Half Width: | 30 | Surface 7 | STANDARD | Surface 16 | COORDBRK |
| Surface 2 | STANDARD | Aperture: | Rectangular Aperture | Decenter X: | 0 |
| Aperture: | Rectangular Aperture | X Half Width: | 6 | Decenter Y: | 0 |
| X Half Width: | 6 | Y Half Width: | 30 | Tilt about X: | 0 |
| Y Half Width: | 30 | Surface 8 | STANDARD | Tilt about Y: | -45 |
| Surface 3 | COORDBRK | Surface 9 | STANDARD | Tilt about Z: | 0 |
| Decenter X: | 0 | Surface 10 | STANDARD | Order: | Decenter then tilt |
| Decenter Y: | 0 | Surface 11 | STANDARD | Surface 17 | STANDARD |
| Tilt about X: | 0 | Aperture: | Rectangular Aperture | Aperture: | Rectangular Aperture |
| Tilt about Y: | -45 | X Half Width: | 6 | X Half Width: | 6 |
| Tilt about Z: | 0 | Y Half Width: | 30 | Y Half Width: | 30 |
| Order: | Decenter then tilt | Surface 12 | STANDARD | Surface 18 | STANDARD |
| Surface 4 | STANDARD | Aperture: | Rectangular Aperture | Aperture: | Rectangular Aperture |
| Aperture: | Rectangular Aperture | X Half Width: | 6 | X Half Width: | 6 |
| X Half Width: | 6 | Y Half Width: | 30 | Y Half Width: | 30 |
| Y Half Width: | 30 | Surface STO | STANDARD | Surface 19 | STANDARD |
| Surface 5 | COORDBRK | Aperture: | Rectangular Aperture | Aperture: | Rectangular Aperture |
| Decenter X: | 0 | X Half Width: | 6 | X Half Width: | 6 |
| Decenter Y: | 0 | Y Half Width: | 30 | Y Half Width: | 30.135982 |
| Tilt about X: | 0 | Surface 14 | COORDBRK | Surface IMA | STANDARD |
| Tilt about Y: | -45 | Decenter X: | 0 | Aperture: | Rectangular Aperture |
| Tilt about Z: | 0 | Decenter Y: | 0 | X Half Width: | 6 |
| Order: | Decenter then tilt | Tilt about X: | 0 | Y Half Width: | 43 |
| | | Tilt about Y: | -45 | | |
| | | Tilt about Z: | 0 | | |
| | | Order: | Decenter then tilt | | |

SYSTEM COMPRISING A SPECTRALLY SELECTIVE DETECTOR

CROSS REFERENCE TO RELATED APPLICATIONS

This case a divisional application of co-pending U.S. patent application Ser. No. 14/185,364 filed Feb. 20, 2014, which is a continuation-in-part of U.S. patent application Ser. No. 13/095,407 (now U.S. Pat. No. 8,830,377) filed 27 Apr. 2011, which claims priority of U.S. Provisional Patent Application 61/328,213, and which is also a continuation-in-part of U.S. patent application Ser. No. 12/651,894 (now U.S. Pat. No. 8,259,212), filed 4 Jan. 2010, which claims priority of U.S. Provisional Patent Application 61/142,499, each of which is incorporated herein by reference in its entirety.

FIELD OF THE INVENTION

The present invention relates to optics in general, and, more particularly, to imaging systems.

BACKGROUND OF THE INVENTION

A typical digital camera system includes a lens system and an array of optoelectronic detector elements located at a focal plane of that lens system (commonly referred to as a "focal-plane array"). The lens system normally includes a number of optical elements that collectively image a scene onto a focal-plane array. Each pixel of the focal-plane array converts the portion of the image it receives into an electrical signal whose magnitude is a function of light intensity. The electrical signals are then processed to develop a composite digital image of the scene and/or estimate one or more properties of the scene.

For cameras used in many surveillance applications, such as security checkpoints, it is important to collect light for a large volume at high resolution. As digital camera systems have evolved, optical elements and detector arrays have been becoming progressively smaller. Unfortunately, angular resolution and number of resolvable object points typically scale with the size of an imaging system and optical performance begins to suffer as the optical elements and detector elements shrink. Many prior-art imaging systems trade wide field for image resolution and use many imagers to collectively image a large scene. Unfortunately, such an approach gives rise to large and expensive imaging systems.

Lens system design begins by specifying targets for major performance metrics, such as angular resolution, field-of-view, depth of field, spectral range, sensitivity, dynamic range, system mass and volume. Angular resolution is generally the most significant initial metric. The best angular resolution of a lens is given by $\lambda/A$, where $\lambda$ is the operating wavelength and A is the collection aperture diameter. Once the collection aperture size has been determined by this relationship, a lens is designed to achieve the remaining performance metrics by judicious choice of materials and surface profiles.

In conventional lens design, the aperture size of an entrance lens or optical stop (i.e., the primary aperture) often determines the effective aperture size of all subsequent lens surfaces (i.e., the secondary aperture) in the lens system. The use of multiple lenses and apertures enables a lens system to simultaneously create an effective focal length and magnification appropriate to the imaging task at hand, reduce image aberrations, and provide correct image orientation. Secondary apertures are typically matched to the effective cross section of the magnified or demagnified entrance aperture propagated through the lens system. In systems with low aberration, the size of the entrance aperture often determines angular resolution of the lens system while the size of the secondary apertures determines the field-of-view of the lens system.

Simple cameras typically balance field-of-view and resolution by using a sequence of lenses having approximately equally sized apertures. Microscopes, on the other hand, achieve large field-of-view and high angular resolution by increasing secondary aperture relative to the collection aperture. Telescopes achieve extra-ordinary angular resolution with a limited field-of-view by decreasing secondary aperture size. Wide-field cameras achieve large field-of-view by tolerating significant aberration across the image with approximately equal primary and secondary apertures. Conventional lens design, therefore, normally requires trade-offs between desired performance metrics. For example, telescopes achieve high angular resolution by sacrificing field-of-view, wide-field imagers achieve large angular fields-of-view by sacrificing diffraction-limited angular resolution, and compound-optics cameras achieve high quality by expanding system volume to include more aberration-correction optics.

Multi-aperture cameras have been developed to overcome some of the limitations of standard imaging optics. In multi-aperture systems, a standard camera objective lens is replaced by an array of lenslets, wherein each lenslet has a reduced focal length in comparison to a conventional camera. In such an approach, a detector measures a set of sub-sampled versions of the scene within the field-of-view. Post-processing algorithms are used to generate a high-resolution image from the set of sub-sampled sub-images. The result is reduced system volume; however, the reduction in system volume is achieved at the cost of significant computational post-processing, as well as compromised image quality.

Further, the design space for multi-aperture cameras is severely restricted. The use of a multi-aperture camera requires that the size of its detector array and system aperture be approximately the same size. As a result, conventional multi-aperture designs are generally restricted to very small collection apertures. This also limits the number of camera formats that can be designed. Further, a multi-aperture camera typically has a restricted field-of-view due to a need to prevent the overlapping of sub-images on the detector array. Such overlapping can be avoided by introducing a field stop in the optical design; however, this increases system volume. Alternatively, absorbing barriers can be placed between the sub-image regions of the detector array; however, this significantly increases manufacturing cost and complexity. These drawbacks have, thus far, limited adoption of multi-aperture cameras in practical systems.

An imaging system that cost-effectively achieves high image resolution and field-of-view in a compact footprint would represent a marked improvement of the state of the art.

SUMMARY OF THE INVENTION

The present invention enables optical systems that overcome some of the disadvantages of the prior art. Specifically, the present invention enables optical imaging systems based on an objective lens that has many of the benefits of a monocentric objective lens, as well as lower system cost, size, weight, and/or complexity. Embodiments of the present invention are particularly well suited for use in surveillance systems and high-resolution, large-field imaging systems.

An imaging system in accordance with the present invention includes an objective lens that includes at least one plastic lens element. The objective lens collects light from a scene and images the light at a substantially spherically shaped intermediate image field.

An illustrative embodiment of the invention includes a quasi-monocentric lens and a plurality of microcameras, each of which relays a different portion of the image field onto its respective sensor array, which forms a digital image of the received sub-portion of the scene. The objective lens comprises a diffractive entry surface that serves to correct the chromatic performance of the lens, which is otherwise degraded due to the use of plastic lens elements.

In some embodiments, at one of the plurality of microcameras corrects one or more aberrations in the image portion it relays onto its sensor array. In some embodiments, the microcameras are mounted directly on the exit surface of the objective lens, at which the intermediate image is formed.

In some embodiments, a plurality of sensor arrays, without secondary optics, are mounted directly to the exit surface of the objective lens.

In some embodiments, a monocentric objective lens includes a mirror located at a plane that runs through the center of curvature of the objective lens. In some embodiments, an objective lens includes a second mirror that creates a second fold of the optical path through the objective lens, wherein the second mirror does not contain the center of curvature of the lens.

An embodiment of the present invention is an imaging system comprising an objective lens that is operative for providing a first image of a scene, the objective lens comprising a first lens element that includes a first polymer; a first surface, wherein each point on the first surface is equidistant from a center point of the objective lens; and a second surface that is a diffractive surface.

BRIEF DESCRIPTION OF THE DRAWINGS

FIG. 4A provides general lens data for objective lens 102.

FIG. 4B provides a summary of surface data for objective lens 102.

FIG. 4C provides surface data detail for objective lens 102.

FIG. 7 provides a table that summarizes the design parameters for the optics of a representative microcamera in accordance with the illustrative embodiment of the present invention.

FIG. 9A provides general lens data for objective lens 802.

FIG. 9B provides a summary of surface data for objective lens 802.

FIG. 9C provides surface data detail for objective lens 802.

FIG. 13A provides general lens data for objective lens 1202.

FIG. 13B provides a summary of surface data for system 1200.

FIG. 13C provides surface data detail for system 1200.

FIG. 15A depicts a schematic drawing of a side view of a sensor array in accordance with the second alternative embodiment of the present invention.

FIG. 15B depicts a detailed view of cover glass 1504.

FIG. 17A provides general lens data for objective lens 1600.

FIG. 17B provides a summary of surface data for objective lens 1600.

FIG. 17C provides surface data detail for objective lens 1600.

FIGS. 19A-B depict schematic drawings of top and side views, respectively, of a folded objective lens in accordance with a fourth alternative embodiment of the present invention.

FIG. 20A provides general lens data for objective lens 1900.

FIG. 20B provides a summary of surface data for objective lens 1900.

FIG. 20C provides surface data detail for objective lens 1900.

FIGS. 22A-B depict schematic drawings of a top and side view, respectively, of an objective lens in accordance with a fifth alternative embodiment of the present invention.

FIG. 23A provides general lens data for objective lens 2200.

FIG. 23B provides a summary of surface data for objective lens 2200.

FIG. 23C provides surface data detail for objective lens 2200.

DETAILED DESCRIPTION

Figure 1:
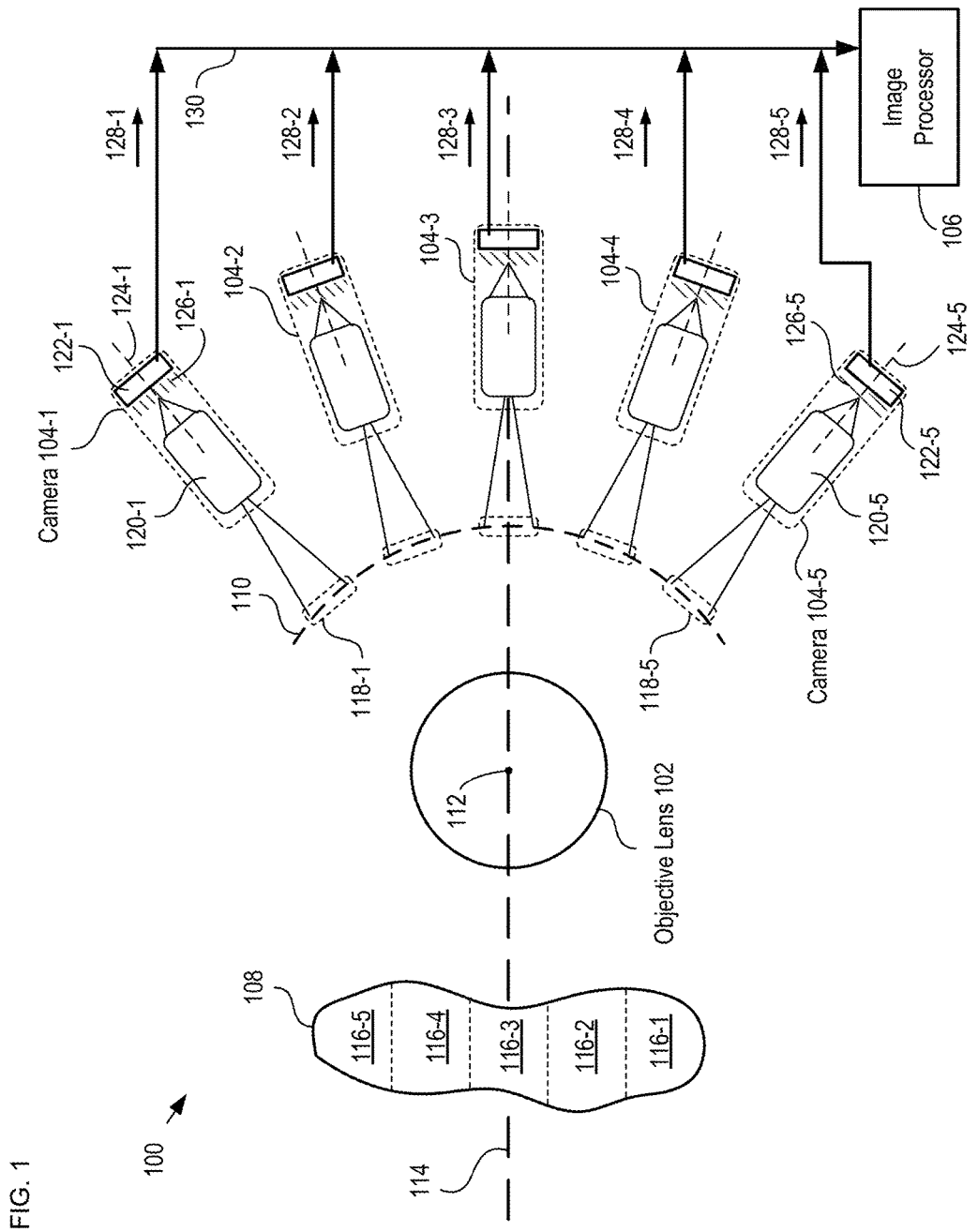
FIG. 1 depicts a schematic drawing of an optical system in accordance with an illustrative embodiment of the present invention.

As disclosed in U.S. Pat. No. 8,259,212, which is related to the present case, a multi-scale optical system comprises a single objective lens and an array of small secondary lenses. The objective lens and the microcameras divide the task of imaging a scene. The objective forms an imperfect intermediate image of the scene, where the intermediate image includes localized aberrations. The microcameras relay portions of the intermediate image onto their respective focal-plane arrays, while also reducing the localized aberrations, to yield a plurality of highly resolved optical sub-images. The focal-plane arrays convert the plurality of optical sub-images into digital sub-images of the relayed portions of the scene, which are then processed to form a composite digital image of the entire scene.

The multi-scale imaging approach affords significant advantages over other imaging approaches. First, because the task of imaging is split between the objective lens and secondary lenses each of the collecting and processing functions can be individually improved without significantly comprising the design of the other. It also enables a large-scale objective lens to be used with a large-count multi-aperture array, thereby reducing the trade-off between geometric aberration and field-of-view.

In addition, the multi-scale imaging approach enables two adjacent secondary lenses to gather rays from the same image point by locating the secondary lenses at positions displaced from the image field but near one another laterally. Such an arrangement enables light from a given point image to always be captured by at least one secondary lens. As a result, blind spots due to lateral spacing between adjacent sensor arrays are avoided.

Second, the secondary lenses can include a degree of wavefront correction to correct aberrations introduced by the large-scale objective lens. This reduces the design complexity required for the objective lens. This also enables faster collection optics, which reduces overall system volume.

Third, manufacturing cost and complexity can be significantly lower for a multi-scale imaging system. Smaller lenses are better at providing wavefront correction because: 1) wavefront correction and image formation both yield geometric solutions with less wavelength-scale error over smaller apertures; and 2) manufacturing of complex lens surfaces is much easier in smaller scale systems.

Fourth, in some multi-scale imaging systems, the secondary lenses are designed to focus at diverse ranges with overlapping fields. This enables tomographic object reconstruction by combining multi-scale imaging with multi-dimensional image capture, such as, for example, in a TOMBO-based system (Thin Observation Module by Bound Optics).

Finally, multi-scale design enables the use of multiple discrete focal plane arrays. As a result, the discrete focal plane arrays can be arranged in any advantageous manner, including non-planar arrangements—for example, an arrangement that matches the shape of the image field of the objective lens. Further, the size of the focal plane arrays can be selected at a granularity that reduces fabrication cost and increases overall reliability. Still further, the sub-images from the plurality of focal plane arrays can be collectively synthesized into a spatially correlated image of a scene without the stitching and field uniformity issues found in prior-art imaging systems. And yet further, the complexity of the post-processing required to synthesize the full-scene image is significantly less for embodiments of the present invention than the computational post-processing required in prior-art imaging systems, such as a TOMBO-based system.

As disclosed in U.S. patent application Ser. No. 13/095,407, which is the parent application of this case, an improved multi-scale optical system can be developed by employing a monocentric lens as the objective lens. Monocentric lenses are lenses where the surfaces share a common center of curvature. In many applications, a monocentric lens has an advantages in that, except for vignetting, the images of points formed from any incident angle are the same.

The use of a monocentric objective lens can enable an imaging systems having a large field of view, since the field of view of a monocentric lens is limited only by vignetting. While monocentric reflective and catadioptric objective-based telescopic imaging systems have been demonstrated, it has proven difficult to achieve large fields of view in practice. Catadioptric telescopes have proven difficult to achromatize and usually require an objective mirror significantly larger than the entrance pupil. Refractive designs do not have this disadvantage; however, aperture obscuration in a reflective telescope can give rise vignetting, which increases at higher field angles. Further, chromatic aberrations in a very large refractive objective are considerable and can be difficult to correct.

Multiscale-monocentric designs can also achieve a lower element count and are often less complex than other types of wide-angle lens-based imaging systems. Monocentric designs can have a field of view as large as 120° in two axes.

In some surveillance applications, however, even conventional monocentric objective designs may be larger than desired. Further, glass-based monocentric lenses can be costly to produce and it can be difficult to integrate complex/diffractive surfaces into them. Further, glass optics can add significant weight to an optical system.

The present invention enables multi-scale imaging systems having a smaller footprint, as well as potentially smaller size, lower weight, and/or cost. Further, some embodiments of the present invention are more easily mass produced, can more easily incorporate complex surfaces, and are amenable to high-volume plastic molding processes.

Some embodiments of the present invention include an objective that is quasi-monocentric and "folded" to make the beam path and instrument more compact. As a result, embodiments in accordance with the present invention can have one or more of decreased size, weight, and cost, as well as improved instrument stability.

FIG. 1 depicts a schematic drawing of an optical system in accordance with an illustrative embodiment of the present invention. System 100 comprises objective lens 102, microcameras 104-1 through 104-5, and image processor 106. Although system 100 includes five microcameras, it will be clear to one skilled in the art, after reading this Specification, how to specify, make, and use alternative embodiments of the present invention that comprise any practical number of microcameras.

Figure 2:
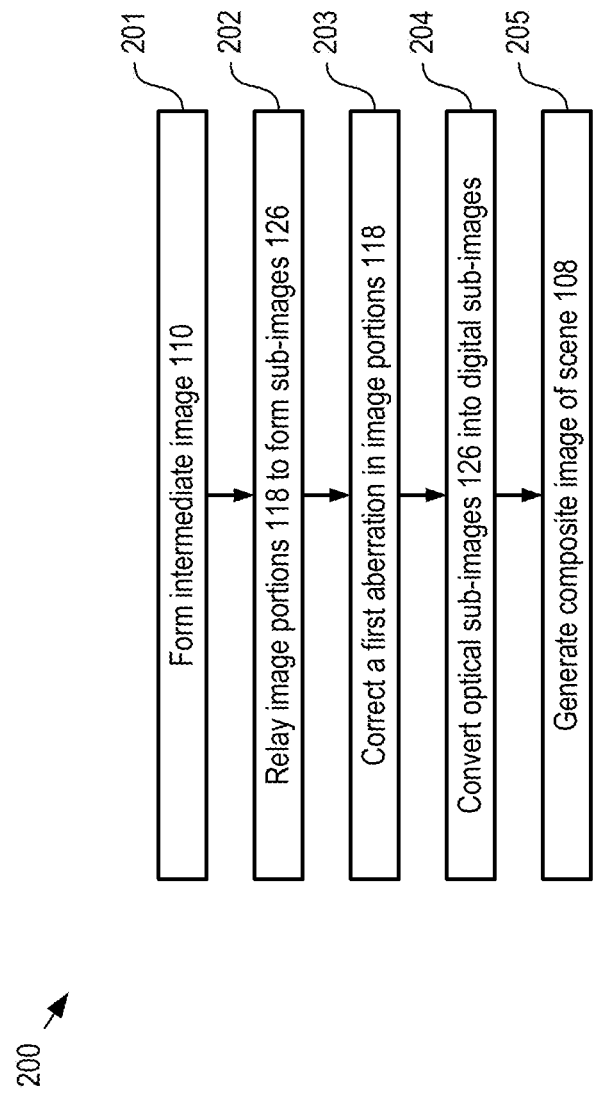
FIG. 2 depicts operations of a method suitable for providing an image in accordance with the illustrative embodiment of the present invention.

FIG. 2 depicts operations of a method suitable for providing an image in accordance with the illustrative embodiment of the present invention. Method 200 begins with operation 201, wherein objective lens 102 forms intermediate image 110 of scene 108.

Objective lens 102 is a quasi-monocentric lens suitable for collecting a sufficient amount of light 110 received from scene 108. Objective lens 102 has an included field of view of approximately 120 degrees (i.e., up to 60° off-axis).

Figure 3:
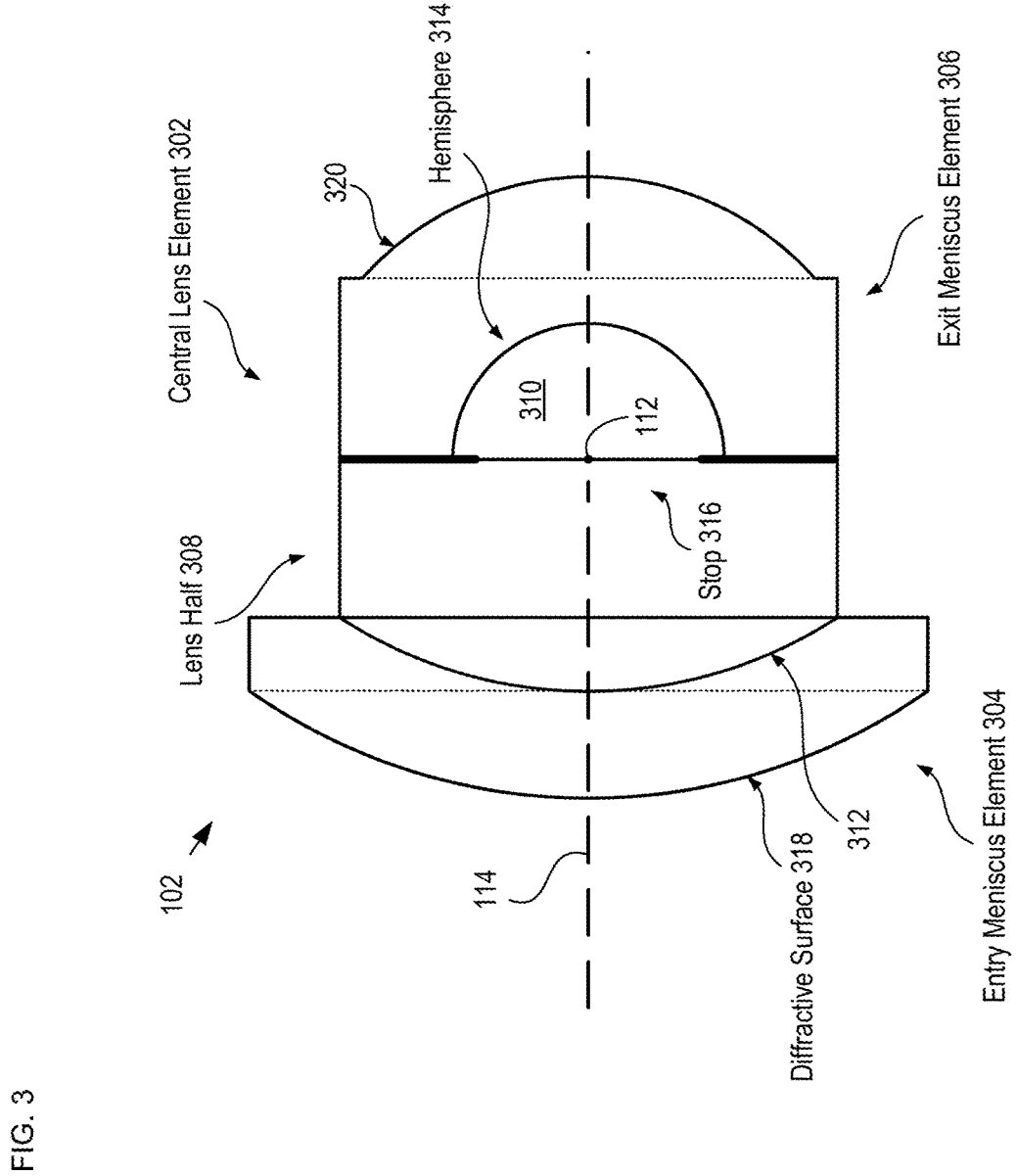
FIG. 3 depicts a schematic drawing of a cross-sectional view of an objective lens in accordance with the illustrative embodiment of the present invention.

FIG. 3 depicts a schematic drawing of a cross-sectional view of an objective lens in accordance with the illustrative embodiment of the present invention. Objective lens 102 is a multi-element quasi-monocentric lens comprising central lens element 302, entry meniscus element 304, and exit meniscus element 306. FIG. 3 is described herein with continuing reference to FIGS. 1 and 2.

Central lens element 302 is a converging lens element that includes lens half 308 and hemisphere 310. Each of lens half 308 and hemisphere 310 is made of polymethylmethacrylate (PMMA), which acts in similar fashion to crown glass in the design of objective lens 102. Lens half 308 and hemisphere 310 include surfaces 312 and 314, respectively. Lens half 308 and hemisphere 310 are joined to at a central plane comprising center point 112 and optical stop 316 to form a substantially continuous medium for light passing through the lens. It should be noted that each lens element includes a flat region to facilitate its mounting.

Entry meniscus element 304 is made of polycarbonate, which acts in similar fashion to flint glass in the design of objective lens 102. Entry meniscus element 304 includes diffractive surface 318. Diffractive surface 318 is a binary diffractive surface that enables correction of the poor chromatic performance of a fully plastic lens, as discussed below.

Exit meniscus element 306 is also made of polycarbonate and includes surface 320.

Entrance meniscus element 304 and exit meniscus element 306 are typically molded directly to central lens 302.

FIG. 4A provides general lens data for objective lens 102.
FIG. 4B provides a summary of surface data for objective lens 102.
FIG. 4C provides surface data detail for objective lens 102.

The data provided in Table 3 describes surface sag for axisymmetric even aspheric surfaces according to the formula:

$$z(r) = \frac{r^2/R}{1+\sqrt{1-(1+K)r^2/R^2}} + \sum_{i=1}^{N} A_i r^{(2i)}$$

where r is the distance from optical axis 114, R is the radius of curvature at optical axis 114 (denoted by Radius), K is the conic coefficient (K=0 spherical)(denoted by Conic), and $A_i$ is the aspherical coefficient number i (denoted by coeff on r i).

It should be noted that the information provided in each of the tables included herein follow the conventions of Zemax optical design software (Zemax Development Corporation, Bellevue, Wash.), as would be understood by one of ordinary skill in the art.

One skilled in the art will recognize that a monocentric lens identically focuses light arriving from any direction. This enables a monocentric lens to be used for very wide-field viewing. The image formed is spherically shaped rather than plane-shaped, and has unit angular magnification. Because of the symmetry of a monocentric lens, aberrations introduced by the lens are independent of the field point. As a result, a monocentric lens introduces significant amounts of only spherical aberration into light that passes through the lens (neglecting image curvature and image distortion). The introduced aberrations are substantially limited to spherical aberration because it is the only aberration that is independent of field point.

Unfortunately, the chromatic performance of a monocentric lens made from plastic materials alone would typically be relatively poor compared to a similarly size entrance pupil glass monocentric lens. This poor performance is due, in part, to the fact that presently available plastic materials do not have the range of refractive index and Abbe numbers of optical glasses. To compensate for the poor chromatic behavior of its plastic elements, however, objective lens 102 is designed as a quasi-monocentric lens that includes diffractive surface 318 in objective lens 102. As a result, while nearly all of the optical surfaces of the lens have a center of curvature located at center point 112, the effective center of curvature for diffractive surface 318 does not coincide with surfaces 312, 314, and 320. Instead, surfaces 312, 314, and 320 are made slightly aspheric and non-monocentric to offset the slight deviation from monocentricity caused by diffractive surface 318. Because diffractive surface 318 produces a large amount of chromatic aberration compared to its optical power, only a slight deviation from monocentricity is required to compensate, however.

To create the design for object lens 102, as provided in FIGS. 4A-C, the plastic objective was initially designed as monocentric. A diffractive element was then added to the front surface of the lens to form diffractive surface 318. To compensate for this diffractive element, the other surfaces were then allowed to deviate slightly from their initial monocentricity.

Figure 5:
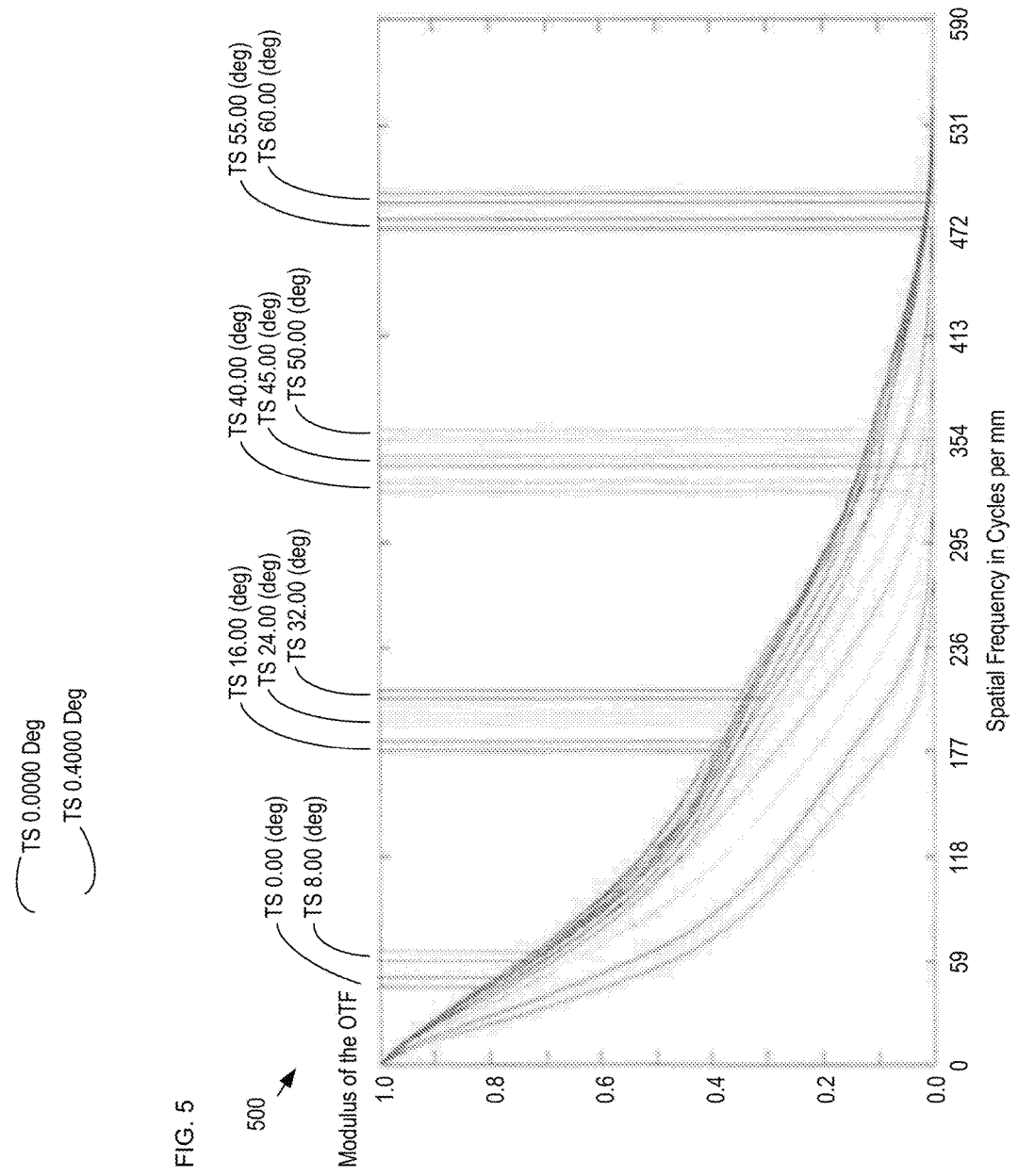
FIG. 5 depicts a polychromatic diffraction modulation transfer function curve for objective lens 102.

FIG. 5 depicts a polychromatic diffraction modulation transfer function curve for objective lens 102.

In some embodiments, diffractive surface 318 is protected by a window in front of objective lens 102. In some embodiments, diffractive surface 318 is protected by a dome that is concentric with optical stop 316. The thickness and material refraction of the dome are then compensated for in the optical prescription of objective lens 102.

In some embodiments, objective lens 102 is scaled down sufficiently that chromatic aberrations due to the materials of the lens are substantially insignificant. In such embodiments, the diffractive element is omitted from the lens design and objective lens 102 is strictly monocentric.

It should be noted that, although objective lens designs in accordance with the present invention are preferably suitable for plastic molding processes, such objective lens designs are also suited for implementation in molded or polished glass elements.

At operation 202, microcameras 104-1 through 104-5 (referred to, collectively, as microcameras 104) image different portions of intermediate image 110.

Figure 6:
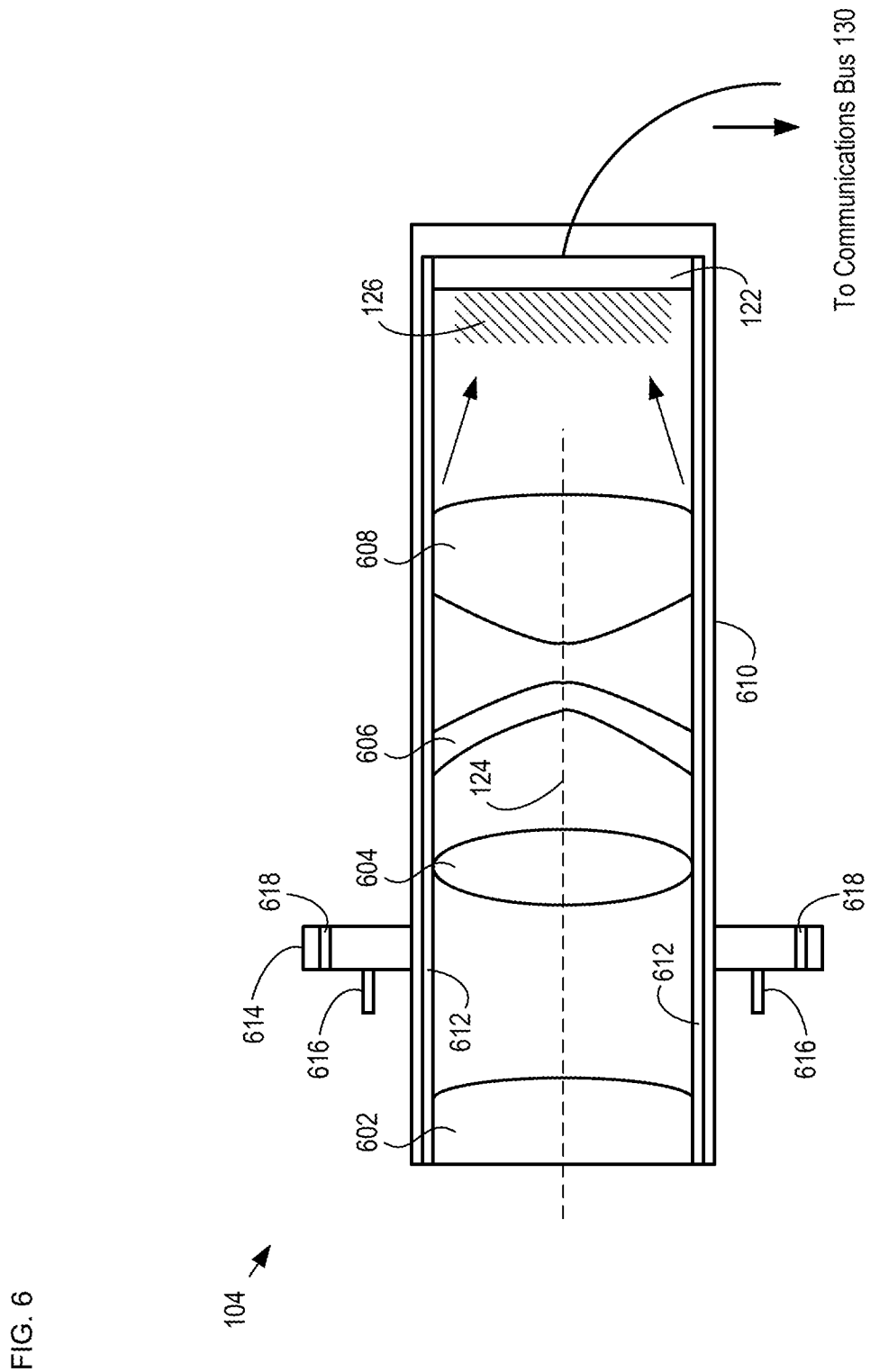
FIG. 6 depicts a schematic drawing of a microcamera in accordance with the illustrative embodiment of the present invention.

FIG. 6 depicts a schematic drawing of a microcamera in accordance with the illustrative embodiment of the present invention. One skilled in the art will recognize that microcamera 104 represents merely one example of a microcamera design suitable for use with the present invention. Microcamera 104 comprises optics 120 and sensor array 122, which are arranged along optical axis 124

Microcameras 104 are arranged in a substantially spherical arrangement having a center of curvature at center point 112. Each microcamera 104 has a unique optical axis 124 that passes through the center of its optics 120 and sensor array 122. As a result, the optics of each microcamera relays a different portion of intermediate image 110 to its corresponding sensor array.

Optics 120-1 through 120-5 relay image portions 118-1 through 118-5 to produce optical sub-images 124-1 through 124-5 at sensor arrays 122-1 through 122-5, respectively. Each of image portions 118 corresponds to a different one of scene portions 116-1 through 116-5. Although image portions 118 are shown as being discontinuous, it will be clear to one skilled in the art, after reading this Specification, that system 100 can be designed with any practical desired spacing between the image fields of microcameras 104. In some embodiments, system 100 is designed such that image portions 118 overlap.

In some embodiments, microcameras 104 are arranged such that gaps exist between image portions 118. In some of the embodiments, multiple systems 100 are arranged such that their respective microcamera arrays collectively image the complete scene 108. In other words, the image regions of multiple imaging systems are interleaved to collectively provide complete coverage of the desired viewing area.

Optics 120 comprises lens elements 602, 604, 606, and 608. Optics 120 is designed to provide an optical sub-image 126 having a diameter within the range of approximately 3 mm to approximately 4 mm.

FIG. 7 provides a table that summarizes the design parameters for the optics of a representative microcamera in accordance with the illustrative embodiment of the present invention.

Lens element 602 is a plano-convex lens having a diameter of approximately 10 mm. Lens element 602 comprises glass having a relatively high refractive index of approximately 1.6200040 and a relatively low Abbe number of approximately 36.366491.

Lens element 604 is a convex-convex lens having a diameter of approximately 10 mm. Lens element 604 comprises glass having a refractive index of approximately 1.486561 and an Abbe number of approximately 84.467994.

Lens element 606 is a concave-convex lens having a diameter of approximately 10 mm. Lens element 606 comprises the same glass used in lens element 602.

Lens element 608 is a convex-convex lens having a diameter of approximately 10 mm. Lens element 608 comprises the same glass used in lens element 604.

Housing 610 is a tube that comprises a material having a low thermal-expansion coefficient. Materials suitable for use in housing 610 include, without limitation, Invar, super Invar, titanium, Zerodur, fused silica, composite materials, and the like.

Housing 610 aligns and holds lens elements 602, 604, 606, and 608 via precision rails 612. Precision rails are micromachined silicon rails that separate the lens elements by air gaps as shown in Table 4. In some embodiments, precision rails are conventionally fabricated rails that comprise a material having a low thermal-expansion coefficient. Collectively, lens elements 602, 604, 606, and 608 enable a secondary lens that images a field-of-view of approximately 1.6 degrees.

Housing 610 also comprises flange 614, which includes pins 616 and slots 618. Pins 616 and slots 618 facilitate alignment of housing 610 with a receptor for holding the plurality of microcameras.

Because objective lens 102 is a quasi-monocentric lens, it produces nearly the same aberrations for all imaged points. In addition, due to its substantially monocentric nature, objective lens 102 produces little or no off-axis aberrations, such as coma or astigmatism, which would require individual correction by different secondary lenses located at different distances off optical axis 114 of imaging system 100. As a result, the same prescription can be used for each optics 120 without regard for the angle of incoming light into objective lens 102. This affords embodiments of the present invention with significant advantages. In particular, the elements of the secondary lenses can be molded in high volume, which dramatically reduces overall system cost. Further, packaging complexity is reduced since the same packaging methodology can be used to align and secure each of optics 120. Still further, identical microcameras 104 can be produced in volume at lower cost.

The lens elements included in optics 120 are amenable to mass production, such as plastic molding or glass molding. As discussed above, these advantages are afforded by the use of a multi-scale optical system design, which enables a trade-off between simplicity in the objective lens design vs. complexity of the secondary lens design. Complexity is better included in the secondary lens design since it is easier and cheaper to fabricate small complex optics than large complex optics.

At operation 203, optics 120 corrects a first aberration in image portion 118.

Although the quasi-monocentric nature of objective lens 102 mitigates introduction of many aberrations into intermediate image 110, the objective lens can introduce some spherical aberration and chromatic aberration. As discussed above, however, the multi-scale imaging approach enables the optics in microcameras 104 to reduce aberrations in the image portions relayed to their respective sensor arrays.

At operation 204, optical sub-images 126 are converted into digital sub-images.

Each of sensor arrays 122-1 through 122-5 is a focal-plane array that comprises a two-dimensional arrangement of 10 million charge-coupled device (CCD) elements having a size of approximately 1.5 microns. The total size of sensor array 122 is suitable for completely sampling an optical sub-image having a diameter within the range of approximately 3 mm to approximately 4 mm.

The electrical output signals 128 from each of sensor arrays 122 are provided to conventional image processor 106 via communications bus 130. Image processor 106 converts electrical signals 128-1 through 128-5 into digital sub-images of scene portions 116-1 through 116-5, respectively.

At operation 205, image processor 106 forms a composite digital image of scene 108 based on the plurality of digital sub-images.

In some embodiments, each of microcameras 104 further comprises an automatic focusing mechanism. In some embodiments, autofocus is performed by a helical focusing arrangement or by translating sensor array 122 along the optical axis 124 of the microcamera. Autofocus capability enables some embodiments of the present invention to focus different portions of scene 108 at different depths.

It should be noted that some objective lenses in accordance with the present invention can used to image scene 108 without the need for microcameras 104. In other words, these objectives can be integrated with one or more electronic sensors (e.g., sensor arrays 122) to form a more compact imaging system.

Figure 8:
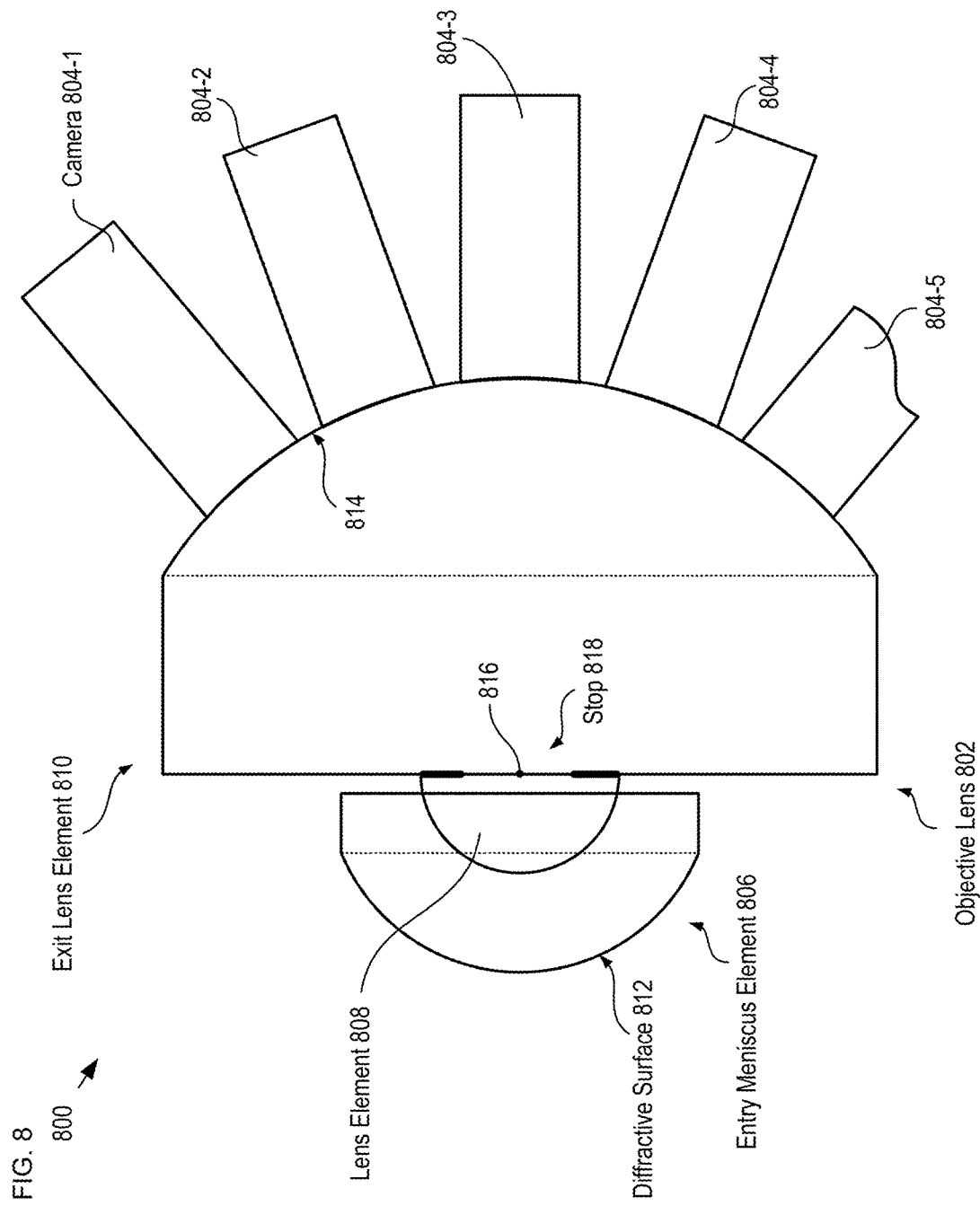
FIG. 8 depicts a schematic drawing of a cross-sectional view of an imaging system in accordance with a first alternative embodiment of the present invention.

FIG. 8 depicts a schematic drawing of a cross-sectional view of an imaging system in accordance with a first alternative embodiment of the present invention. Like system 100, system 800 includes an objective lens made of plastic elements and that incorporates a diffractive entry surface. In contrast to system 100, however, the objective lens included in system 800 is designed to form an image at the surface of its last lens element. System 800 includes objective lens 802 and microcameras 804-1 through 804-5.

Objective lens 802 comprises entry meniscus element 806, lens element 808, and exit lens element 810.

Entry meniscus element 806 is a meniscus element made of polycarbonate. As discussed above and with respect to FIG. 3, polycarbonate acts in similar fashion to flint glass in the design of objective lens 802. Entry meniscus element 806 includes diffractive surface 812, which provides correction of the poor chromatic performance of a fully plastic lens, as discussed above.

Lens element 808 is a quasi-hemispherical lens element embedded in entry meniscus element 806. Lens element 808 is made of PMMA, which acts in similar fashion to crown glass in the design of objective lens 802.

Exit lens element 810 is also made of PMMA. Exit lens element 810 and lens element 808 are joined at a central plane comprising center point 816 and optical stop 818 to form a substantially continuous medium for light passing through the lens.

Exit lens element 810 includes surface 814, which acts as a structure to which microcameras 804-1 through 804-5 can be mounted. As a result, the design of objective lens 802 simplifies or obviates the design of a separate structure to maintaining the position of the microcameras.

FIG. 9A provides general lens data for objective lens 802.

FIG. 9B provides a summary of surface data for objective lens 802.

FIG. 9C provides surface data detail for objective lens 802.

Figure 10:
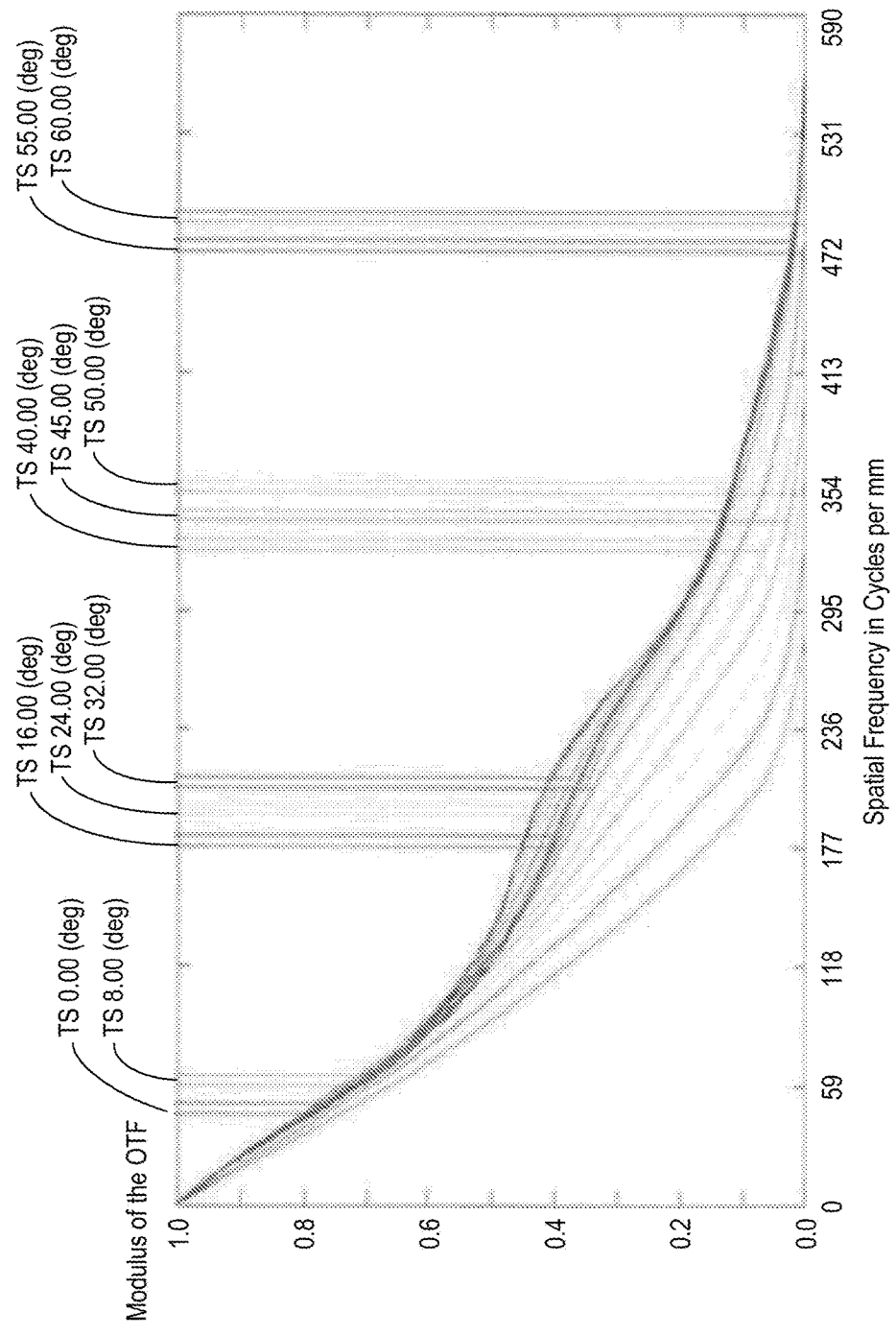
FIG. 10 depicts a polychromatic diffraction modulation transfer function curve for objective lens 802.

FIG. 10 depicts a polychromatic diffraction modulation transfer function curve for objective lens 802 in accordance with the first alternative embodiment of the present invention.

Figure 11:
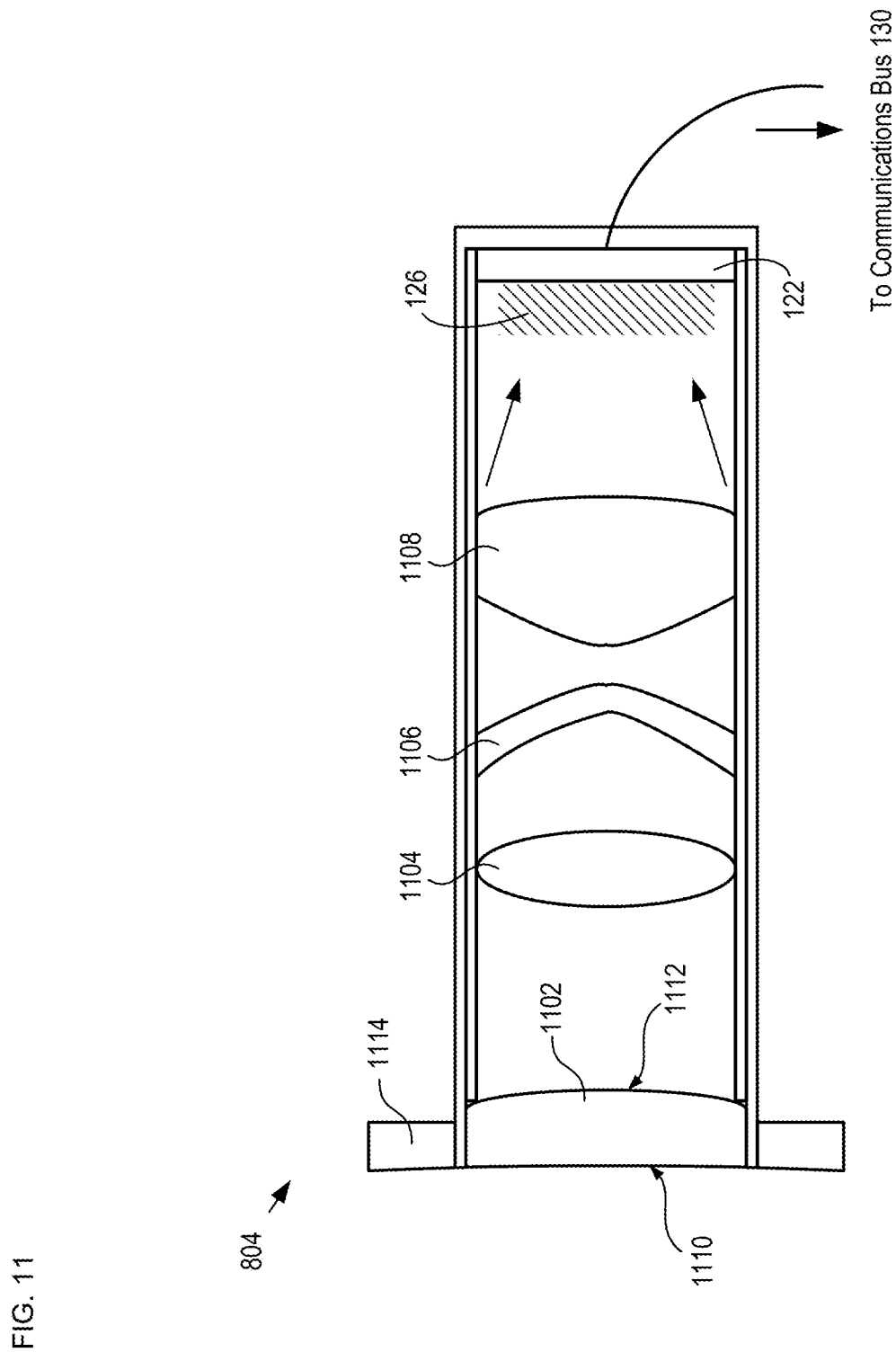
FIG. 11 depicts a schematic drawing of a side view of a microcamera in accordance with the first alternative embodiment of the present invention.

FIG. 11 depicts a schematic drawing of a side view of a microcamera in accordance with the first alternative embodiment of the present invention. Microcamera 804 is representative of each of microcameras 804-1 through 804-5.

The design of microcamera 804 is analogous to the design described above and with respect to microcamera 104; however, lens element 1102 includes entry surface 1110 that has a curvature matched to that of surface 814 of exit lens element 810. One skilled in the art will recognize, after reading this Specification, that lens surface 1112, as well as the specific designs of lens elements 1104, 1106, and 1108, will be altered slightly to accommodate the curvature of entry surface 1110.

Further, housing 1114, which contains the elements of microcamera 804, includes flange 1116, which has a shape that is dimensioned to match the curvature of surface 1110 so as to facilitate the mounting of microcameras 804 on that surface. Further housing 1114 is typically designed to substantially minimize the border area around sensor array 122 in order to minimize gaps in the detected image field.

In some embodiments, microcameras 804 are designed to produce overlapping fields of view between them. In such embodiments, objective lens 802 can be designed to image somewhat closer or further than exit surface 814. Overlapping fields of view for microcameras 804 afford such embodiments advantages over prior-art imaging systems, such as an ability to do tomographic imaging by focusing different microcameras at different focal depths, mitigation of gaps in the detected image field, and the like.

Figure 12:
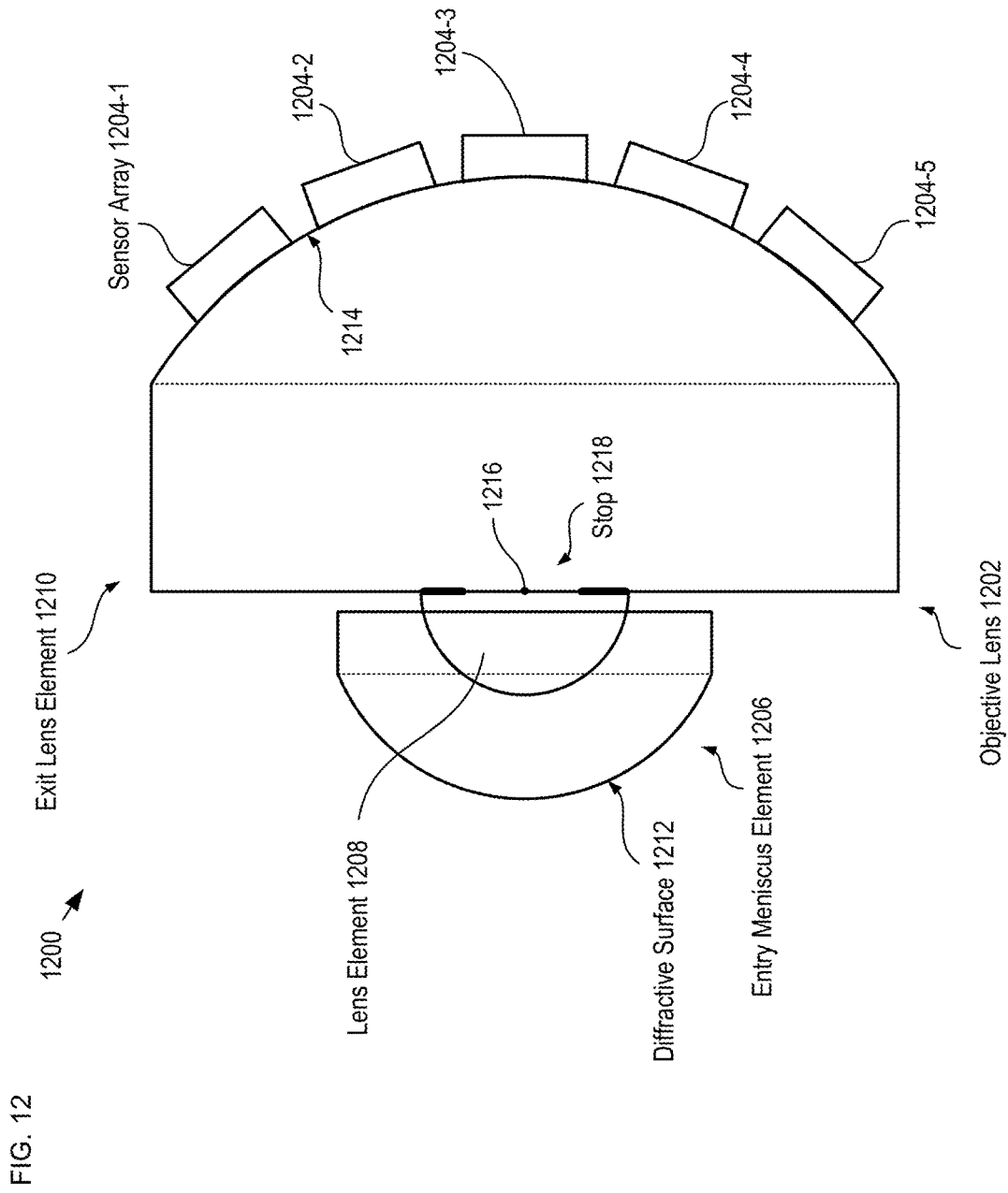
FIG. 12 depicts a schematic drawing of a cross-sectional view of an imaging system in accordance with a second alternative embodiment of the present invention.

FIG. 12 depicts a schematic drawing of a cross-sectional view of an imaging system in accordance with a second alternative embodiment of the present invention. System 1200 comprises objective lens 1202 and sensor arrays 1204-1 through 1204-5.

Objective lens 1202 includes entry meniscus lens 1206, lens element 1208, and exit lens element 1210.

Entry meniscus element 1206 is analogous to entry meniscus element 806, described above and with respect to FIG. 8. Entry meniscus element 1206 includes diffractive surface 1212, which provides correction of the poor chromatic performance of a fully plastic lens, as discussed above.

Lens element 1208 is a quasi-hemispherical lens element embedded in entry meniscus element 1206. Lens element 1208 is made of PMMA, which acts in similar fashion to crown glass in the design of objective lens 1202.

Exit lens element 1210 is also made of PMMA. Exit lens element 1210 and lens element 1208 are joined at a central plane comprising center point 1216 and optical stop 1218 to form a substantially continuous medium for light passing through the lens.

Objective lens 1202 is analogous to objective lens 802 described above and with respect to FIGS. 8-10. The prescription for objective lens 1202 is slightly altered from that of objective lens 802, however, to accommodate direct attachment of sensor arrays to the image surface of the lens (i.e., surface 1214).

FIG. 13A provides general lens data for objective lens 1202.

FIG. 13B provides a summary of surface data for system 1200.

FIG. 13C provides surface data detail for system 1200.

Figure 14:
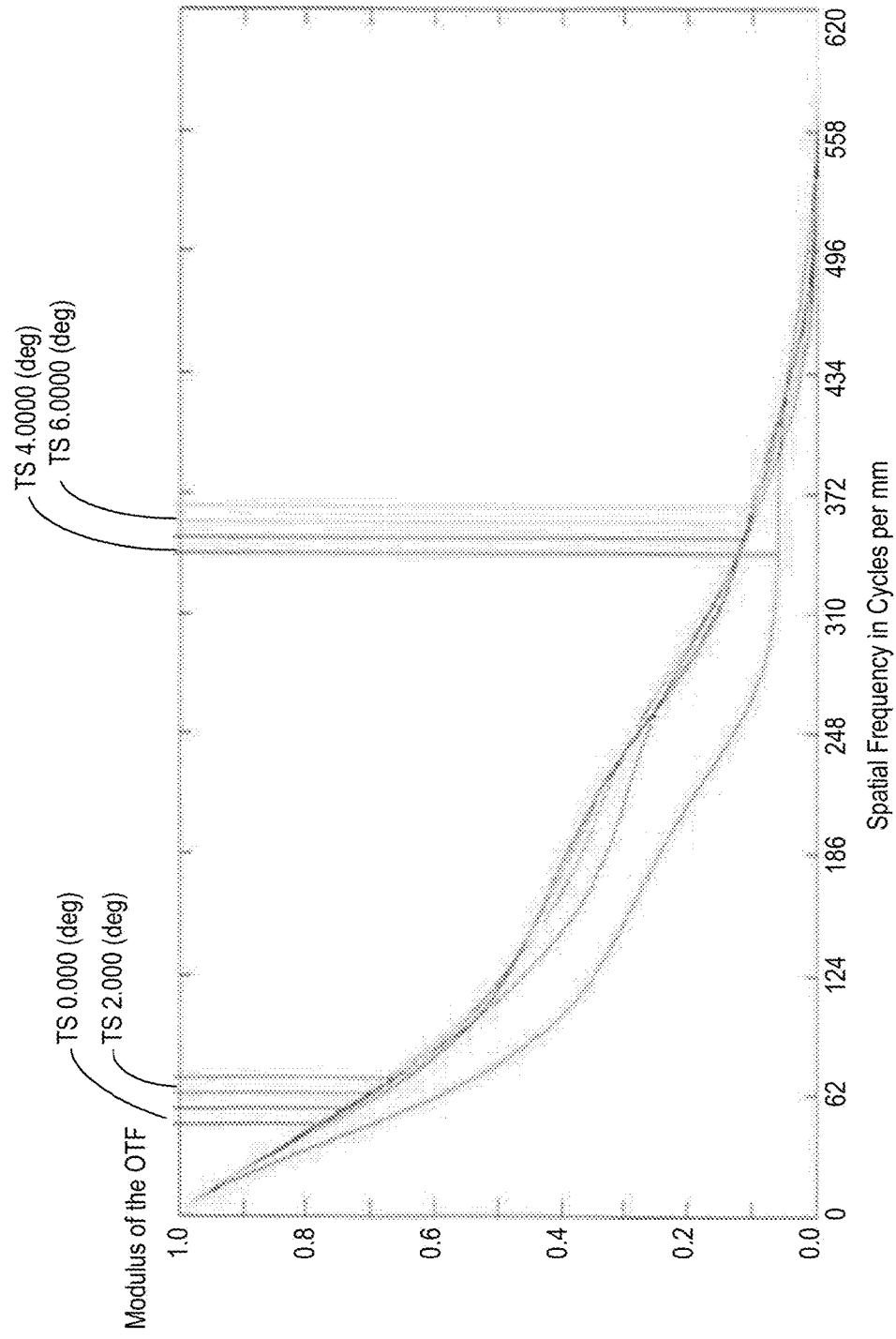
FIG. 14 depicts a polychromatic diffraction modulation transfer function curve for system 1200.

FIG. 14 depicts a polychromatic diffraction modulation transfer function curve for system 1200.

FIG. 15A depicts a schematic drawing of a side view of a sensor array in accordance with the second alternative embodiment of the present invention. Sensor array 1204 includes detector array 1502, cover glass 1504, and housing 1506.

Detector array 1502 is a two-dimensional array of CCD pixels (or equivalent) and its associated circuitry, such as a read-out integrated circuit (ROIC). Detector array 1502 is analogous to focal plane array 122 described above.

Cover glass 1504 is a window for protecting detector array 1502. Cover glass includes surface 1506, which has a curvature that matches that of surface 1214 of exit lens element 1210. Cover glass also includes surface 1508, which has a curvature suitable for correcting curvature of field aberration of objective 1202.

FIG. 15B depicts a detailed view of cover glass 1504. As can be seen in the figure, the curvature of surfaces 1506 and 1508 give rise to each of rays 1510, 1512, 1514, and 1516 focusing at the same plane (i.e., plane 1518), where the surface of detector array 1502 is located.

Housing 1506 is a housing for holding detector array 1502 and cover glass 1504 in precise alignment. Housing 1506 also includes infrastructure for mounting the sensor array to objective lens 1202. In practice, such a microcamera would include dozens of sensor arrays mounted to exit surface 1214. Typically, each housing 1506 would be designed with as small a border region around the photosensitive area of detector array 1502 as possible. By keeping this border region to a minimum, such a microcamera mitigates gaps in the detection field of system 1200.

In some embodiments, multiple imaging systems in accordance with the present invention are used to measure the same scene, where the sensor arrays of the imaging systems collectively have overlapping fields of view.

Figure 16:
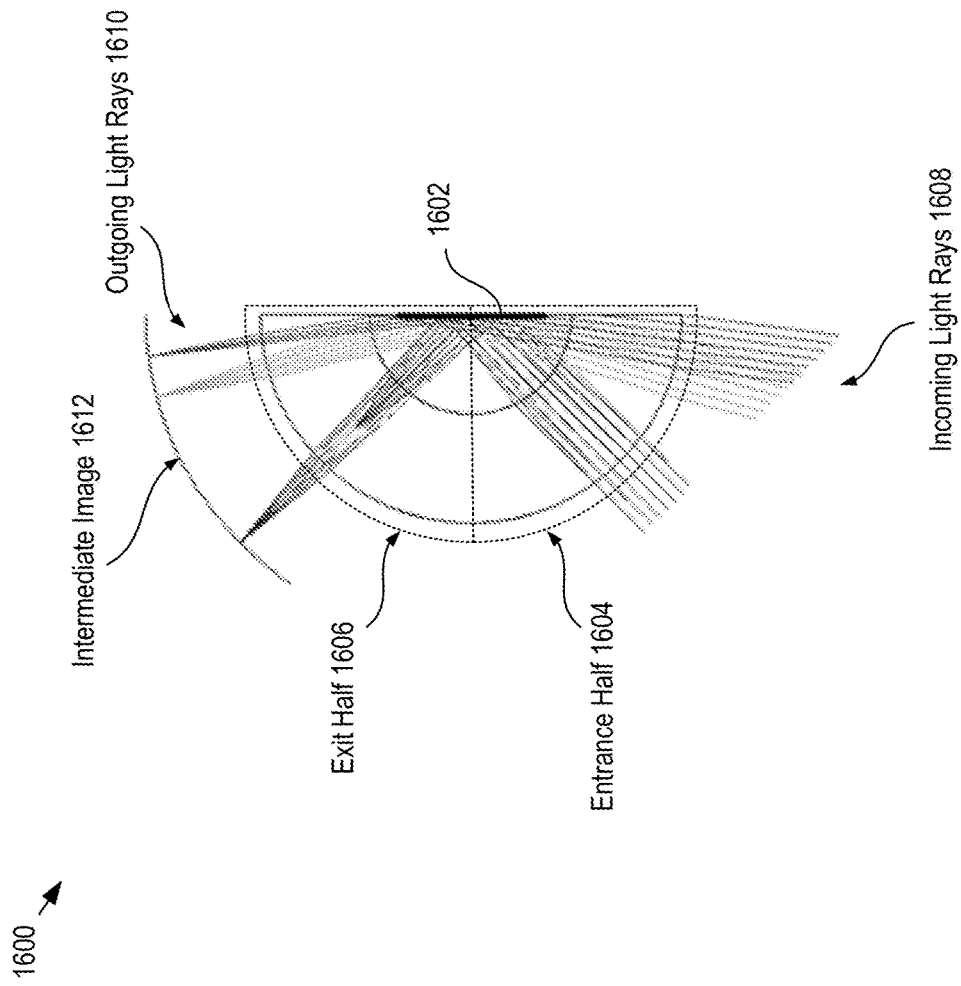
FIG. 16 depicts a schematic drawing of a cross-sectional view of an objective lens in accordance with a third alternative embodiment of the present invention.

FIG. 16 depicts a schematic drawing of a cross-sectional view of an objective lens in accordance with a third alternative embodiment of the present invention. Objective lens 1600 is a monocentric lens having a limited field of view in one dimension and that is folded to reduce the overall size and weight of the imaging system. Objective lens 1600 is particularly well suited to imaging applications in which a view in primarily one direction is needed, such as a wall-mounted, downward-looking camera.

Objective lens 1600 includes mirror 1602, entrance half 1604, and exit half 1606.

Mirror 1602 is a reflective surface placed in the center of curvature of the lens. This surface includes a coating suitable for providing high reflectivity at the operational wavelengths of objective lens 1600. In some embodiments, mirror 1602 acts as a stop for objective lens 1600.

FIG. 17A provides general lens data for objective lens 1600.

FIG. 17B provides a summary of surface data for objective lens 1600. It should be noted that the material designation "E48R" refers to cyclo-olefin optical-grade polymer, such as Zeonex E48R, a plastic available from Zeon Chemicals LP., Louisville Ky., which has an Abbe number of approximately 56 and a refractive index of approximately 1.53.

FIG. 17C provides surface data detail for objective lens 1600.

Figure 18:
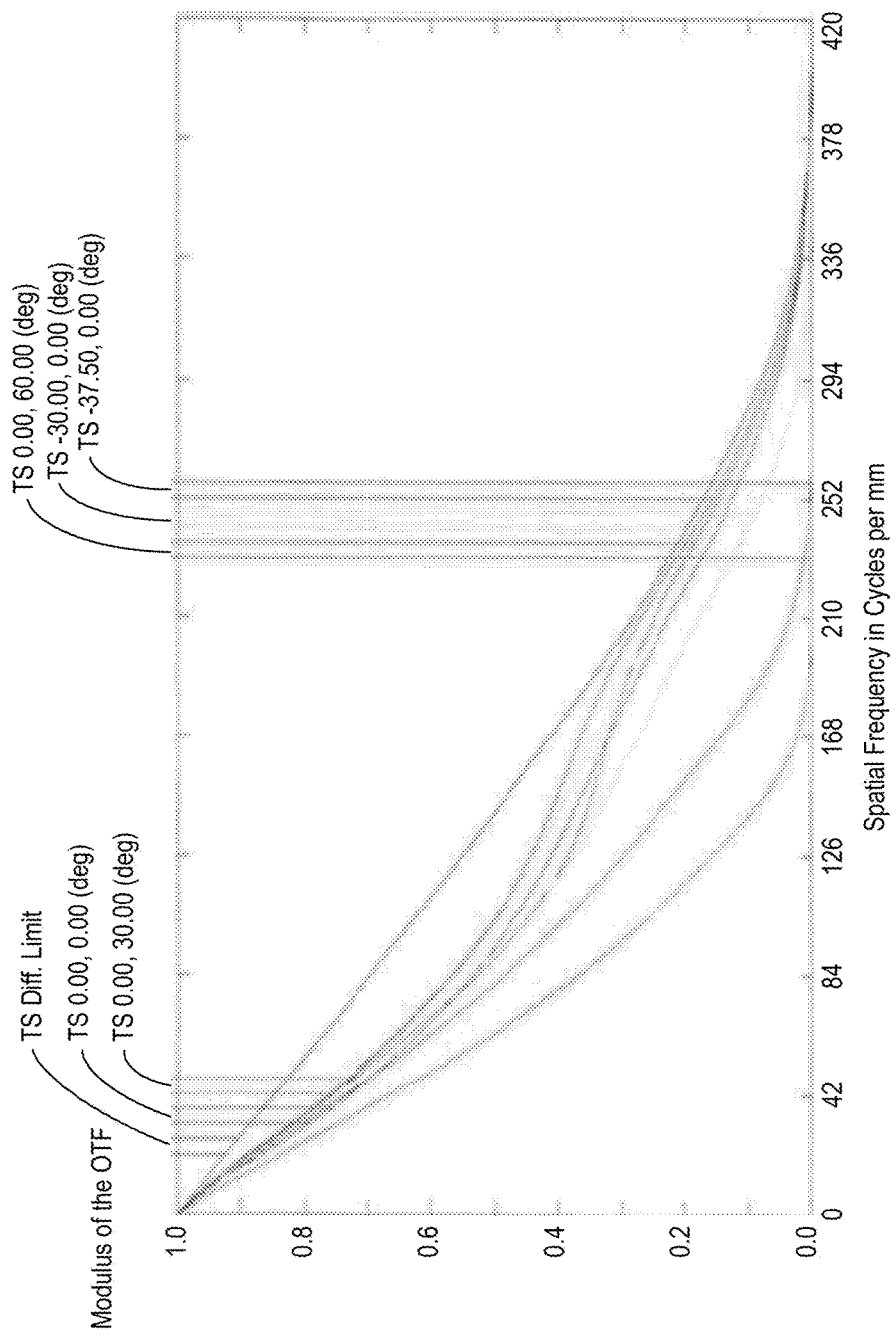
FIG. 18 depicts a polychromatic diffraction modulation transfer function curve for objective lens 1600.

FIG. 18 depicts a polychromatic diffraction modulation transfer function curve for objective lens 1600.

In operation, objective lens 1600 receives incoming light rays 1608 at entrance half 1604. Mirror 1602 folds the beam path inside objective lens 1600 by 90 degrees, due to the 45 degree orientation of the mirror to the nominal incident angle of the on-axis ray.

Incoming light rays 1608 are refracted by entrance half 1604, reflect off of mirror 1602, are further refracted by exit half 1606, and exit the lens as outgoing light rays 1610, which collectively form intermediate image 1612.

For objective lens 1600, the optical designs of entrance half 1604 and exit half 1606 are the same (i.e., objective lens 1600 is symmetric). As a result, objective lens 1600 can image in both directions. In some embodiments, the optical designs of entrance half 1604 and exit half 1606 are not identical. It should be noted that a symmetric design enables a somewhat enhanced field of view, however, as the entrance and exit beam paths can partially overlap. In some embodiments, the beam path is folded at an angle greater than 90 degrees. In some embodiments, the beam path is folded at an angle less than 90 degrees. One skilled in the art will recognize, after reading this Specification, that the choice of folding angle for objective lenses in accordance with the present invention is based on the desired field-of-view and system compactness.

FIGS. 19A-B depict schematic drawings of top and side views, respectively, of a folded objective lens in accordance with a fourth alternative embodiment of the present invention. Objective lens 1900 includes mirror 1902 and lens portion 1904.

FIG. 20A provides general lens data for objective lens 1900.

FIG. 20B provides a summary of surface data for objective lens 1900.

FIG. 20C provides surface data detail for objective lens 1900.

Objective lens 1900 is analogous to a monocentric lens having a finite-width "slice" taken through center point 1906. Because of the asymmetric cross-section of the slice, the stop is also asymmetric resulting in anisotropic resolution.

Mirror 1902 is a plane mirror surface located so as to fold the path of light through the lens. The introduction of mirror 1902 into the beam path is enabled by the fact that the spherical shells of objective lens 1900 are reduced to slices.

Lens portion 1904 is folded upward (as shown) by 90 degrees by the placement of mirror 1902 into the beam path.

In operation, incoming light rays 1908 enter objective lens 1900 along the y-direction via lens portion 1904.

At mirror 1902, the light rays entering are folded by 90 degrees such that they proceed through the objective lens along the z-direction.

After traversing the remaining surfaces of objective lens 1900, the light rays exit as outgoing light rays 1910, which collectively form intermediate image 1912.

In some embodiments, objective lens 1900 is molded such that it includes a fold onto which a conventional mirror coating (e.g. aluminum, silver, dielectric layers, etc.) can be deposited. One skilled in the art will recognize, after reading this Specification, that folds can be introduced into any element or combination of elements of the objective lens as long as their surfaces do not intersect.

Figure 21:
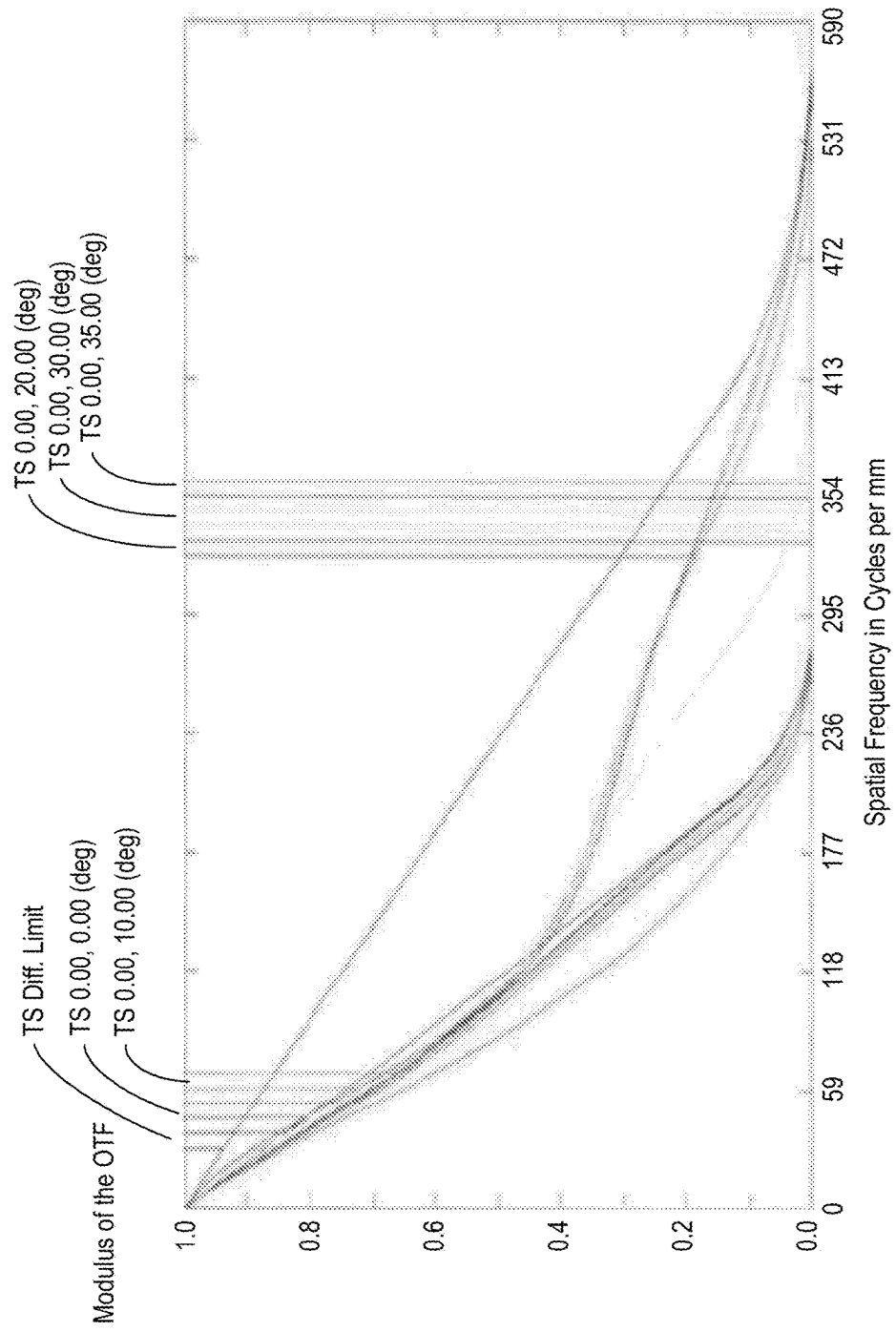
FIG. 21 depicts a polychromatic diffraction modulation transfer function curve for objective lens 1900.

FIG. 21 depicts a polychromatic diffraction modulation transfer function curve for objective lens 1900.

FIGS. 22A-B depict schematic drawings of a top and side view, respectively, of an objective lens in accordance with a fifth alternative embodiment of the present invention. Objective lens 2100 includes mirrors 2202 and 2204.

FIG. 23A provides general lens data for objective lens 2200.

FIG. 23B provides a summary of surface data for objective lens 2200.

FIG. 23C provides surface data detail for objective lens 2200.

In some embodiments, objective lens 2200 is molded such that it includes a fold onto which a conventional mirror coating (e.g. aluminum, silver, dielectric layers, etc.) can be deposited. One skilled in the art will recognize, after reading this Specification, that folds can be introduced into any element or combination of elements of the objective lens as long as their surfaces do not intersect.

Mirror 2202 is analogous to mirror 1902 described above and with respect to FIGS. 19A-B.

Mirror 2204 is a second mirror included to give rise to a second fold of the optical path through the objective lens. In contrast to mirror 2202, however, mirror 2204 is not located such that it contains the center of curvature of the lens (i.e., center point 2206).

It should be noted that, for objective lenses in accordance with the present invention, surfaces that refract light rays after a folding mirror must be centered about the image of the center of curvature reflected through the folding mirror. For folding mirrors that contain the center of curvature, the image of the center of curvature does not change.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An imaging system comprising:
   an objective lens that is operative for providing a first image of a scene, the objective lens having a plurality of surfaces that are concentric about a center point, and the objective lens comprising a first surface that is reflective, the first surface including the center point; and
   a plurality of microcameras, each microcamera of the plurality thereof comprising secondary optics and a sensor array, wherein the secondary optics is operative for relaying a portion of the first image onto the sensor array, and wherein at least one microcamera of the plurality thereof is operative for correcting a first aberration in its respective relayed portion of the first image.

2. The optical system of claim 1 wherein the objective lens includes a first material that is a first polymer.

3. The optical system of claim 2 wherein the objective lens includes a second material that is a second polymer.

4. The optical system of claim 3 wherein the first polymer is a polycarbonate and the second polymer is an acrylic.

5. The optical system of claim 1 wherein the objective lens comprises a second surface that is reflective, the second surface not including the center point.

6. The optical system of claim 1 wherein the first aberration is one of spherical aberration and chromatic aberration.

7. The optical system of claim 6 wherein at least one microcamera of the plurality thereof is operative for correcting both spherical aberration and chromatic aberration.

8. An imaging system comprising:
- an objective lens that is operative for providing a first image of a scene at a first image field, the objective lens having a plurality of surfaces that are concentric about a center point, and the objective lens comprising a first surface that is reflective, the first surface including the center point, wherein the first image includes a first aberration; and
- a plurality of microcameras, each microcamera of the plurality thereof including a sensor array and secondary optics that are operative for relaying a portion of the first image onto the sensor array, wherein at least one of the microcameras of the plurality thereof at least partially corrects the first aberration in the portion of the first image relayed onto its sensor array.

9. The imaging system of claim 8 wherein the objective lens includes a first material that is a first polymer.

10. The imaging system of claim 9 wherein the objective lens includes a second material that is a second polymer.

11. The imaging system of claim 10 wherein the first polymer is a polycarbonate and the second polymer is an acrylic.

12. The imaging system of claim 11 wherein the objective lens comprises a second surface that is reflective, the second surface not including the center point.

13. The imaging system of claim 8 wherein the objective lens forms the first image at a second surface, and wherein a first microcamera of the plurality thereof includes a third surface that is affixed to the second surface.

14. The imaging system of claim 8 wherein the objective lens has anisotropic resolution.

15. The imaging system of claim 8 wherein the objective lens defines an optical path from an entrance half to an exit half, the optical path including the center point.

16. The imaging system of claim 15 wherein the optical path is folded at the center point.

17. The imaging system of claim 16 wherein the optical path is folded at an angle that is greater than 90 degrees.

18. The optical system of claim 8 wherein the objective lens includes a first material that is a polycarbonate and a second material that is an acrylic.

* * * * *